US012620820B2

(12) United States Patent (10) Patent No.: US 12,620,820 B2
Yamaguchi et al. (45) Date of Patent: May 5, 2026

(54) SECONDARY BATTERY PROTECTION CIRCUIT, BATTERY PACK, BATTERY SYSTEM, AND METHOD FOR PROTECTING SECONDARY BATTERY

(71) Applicants: Takeshi Yamaguchi, Tokyo (JP); Iwao Kitamura, Tokyo (JP)

(72) Inventors: Takeshi Yamaguchi, Tokyo (JP); Iwao Kitamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 744 days.

(21) Appl. No.: 17/660,868

(22) Filed: Apr. 27, 2022

(65) Prior Publication Data

US 2022/0368141 A1 Nov. 17, 2022

(30) Foreign Application Priority Data

May 11, 2021 (JP) ................................. 2021-080295

(51) Int. Cl.
*H02J 7/00* (2026.01)
*H02J 7/50* (2026.01)
*H02J 7/60* (2026.01)
*H02J 7/61* (2026.01)
*H02J 7/62* (2026.01)
*H02J 7/63* (2026.01)
*H02J 7/82* (2026.01)
*H02J 7/90* (2026.01)

(52) U.S. Cl.
CPC ................ *H02J 7/663* (2026.01); *H02J 7/50* (2026.01); *H02J 7/61* (2026.01); *H02J 7/62*

(2026.01); *H02J 7/63* (2026.01); *H02J 7/82* (2026.01); *H02J 7/933* (2026.01)

(58) Field of Classification Search
CPC ...................................................... H02J 7/0031
USPC .......................................................... 320/126
See application file for complete search history.

(56) References Cited

U.S. PATENT DOCUMENTS 10,199,679 B2 * 2/2019 Abe .................. H01M 10/0525
2005/0212484 A1 9/2005 Denning et al.
2011/0169458 A1 * 7/2011 Sugiura ................. H02J 7/0031
320/134

(Continued)

FOREIGN PATENT DOCUMENTS

CN 1674403 9/2005
CN 104054232 9/2014

(Continued)

*Primary Examiner* — Yalkew Fantu
(74) *Attorney, Agent, or Firm* — IPUSA, PLLC

(57) ABSTRACT

A secondary battery protection circuit includes a potential-difference control circuit. The potential-difference control circuit provides, when overcharge is detected by an overcharge detection circuit, a control terminal of a charge control transistor with feedback on a potential-difference detection signal to control a potential difference between an electrode of a secondary battery and a terminal for a load and charger. The potential-difference control circuit provides, when overdischarge is detected by an overdischarge detection circuit, a control terminal of each of the charge control transistor and a discharge control transistor with feedback on the potential-difference detection signal to control the potential difference.

14 Claims, 19 Drawing Sheets

(56)  References Cited

U.S. PATENT DOCUMENTS

| | | | |
|---|---|---|---|
| 2015/0035494 A1 | 2/2015 | Suzuki | |
| 2016/0344205 A1 | 11/2016 | Abe | |
| 2017/0133867 A1* | 5/2017 | Banos | H02J 7/0068 |
| 2019/0181660 A1 | 6/2019 | Shibata | |

FOREIGN PATENT DOCUMENTS

| | | |
|---|---|---|
| CN | 106786879 | 5/2017 |
| JP | 2019-106870 | 6/2019 |

* cited by examiner

FIG.3

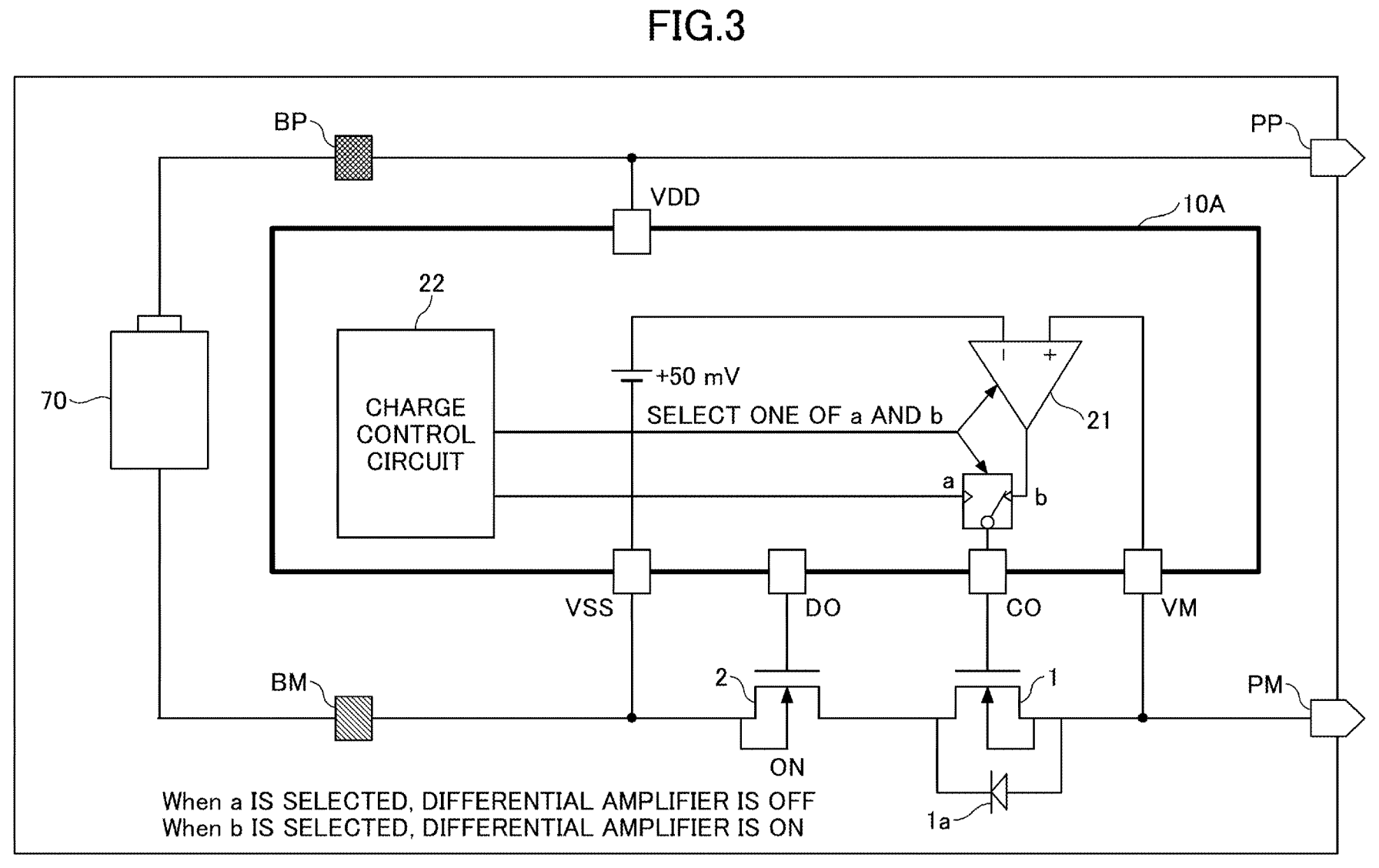

SELECT ONE OF a AND b

+50 mV

CHARGE CONTROL CIRCUIT

When a IS SELECTED, DIFFERENTIAL AMPLIFIER IS OFF
When b IS SELECTED, DIFFERENTIAL AMPLIFIER IS ON

Figure 6:
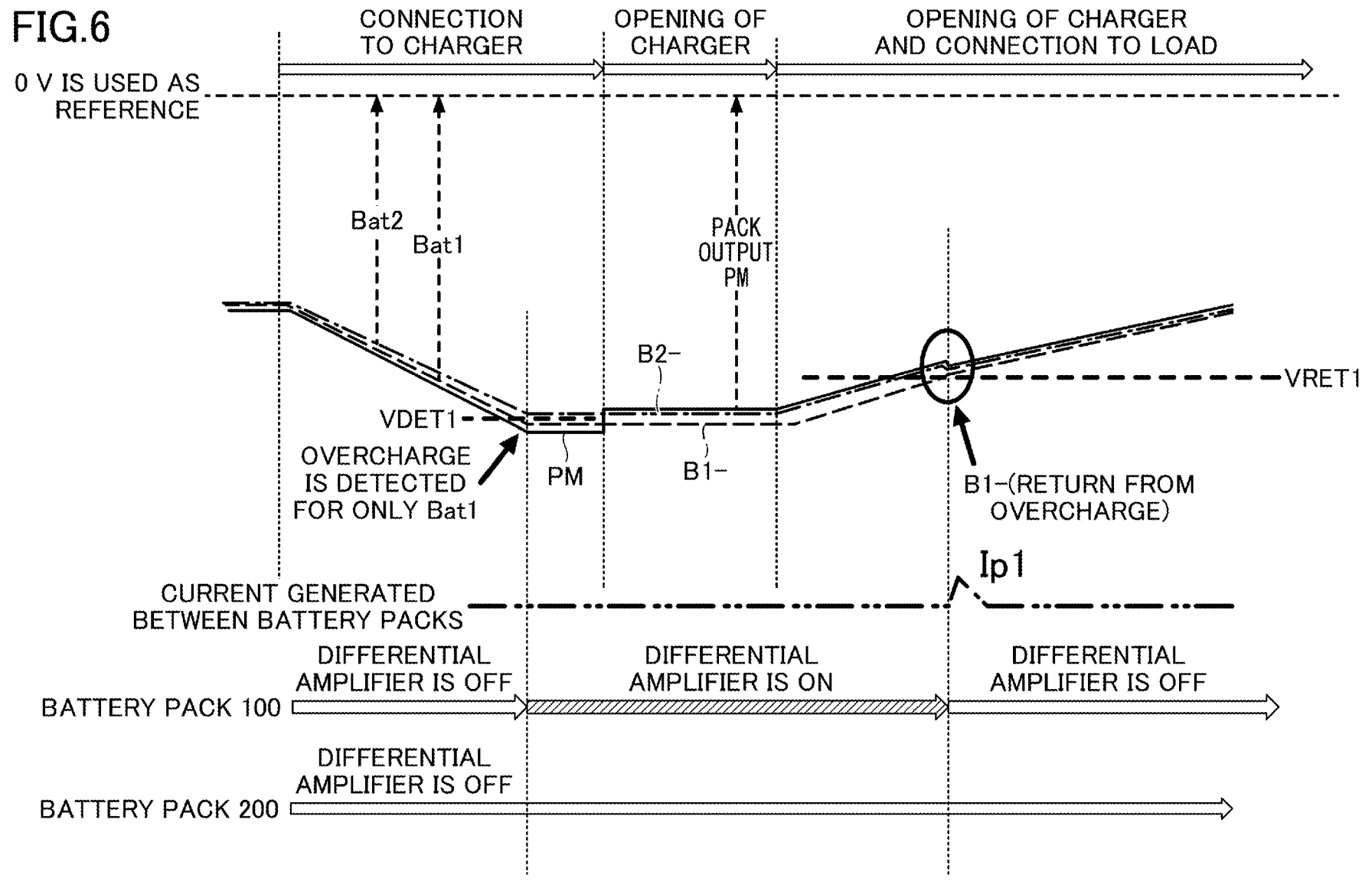

0 V IS USED AS REFERENCE

CONNECTION TO CHARGER

OPENING OF CHARGER

OPENING OF CHARGER AND CONNECTION TO LOAD

VRET1

B1– (RETURN FROM OVERCHARGE)

Ip1

PACK OUTPUT PM

B1–

B2–

PM

VDET1

OVERCHARGE IS DETECTED FOR ONLY Bat1

Bat2 Bat1

CURRENT GENERATED BETWEEN BATTERY PACKS

DIFFERENTIAL AMPLIFIER IS OFF

DIFFERENTIAL AMPLIFIER IS ON

DIFFERENTIAL AMPLIFIER IS OFF

BATTERY PACK 100    DIFFERENTIAL AMPLIFIER IS OFF

BATTERY PACK 200

When a IS SELECTED, DIFFERENTIAL AMPLIFIER IS OFF
When b IS SELECTED, DIFFERENTIAL AMPLIFIER IS ON

FIG.13

| | DISCHARGE CONTROL BY DIFFERENTIAL AMPLIFIER 31 | CHARGE CONTROL BY DIFFERENTIAL AMPLIFIER 21 | REMARKS |
|---|---|---|---|
| NORMAL STATE | OFF | OFF | DIFFERENTIAL AMPLIFIER IS NOT USED |
| OVERCHARGED STATE | OFF | ON | |
| OVERDISCHARGED STATE 1 | ON | OFF | CONNECTION TO CHARGER IS DETECTED OR OUTPUT OF ANOTHER BATTERY PACK IS PROVIDED |
| OVERDISCHARGED STATE 2 | OFF | OFF | ALL BATTERY PACKS ARE OVERDISCHARGED (STANDBY STATE) |

FIG.14

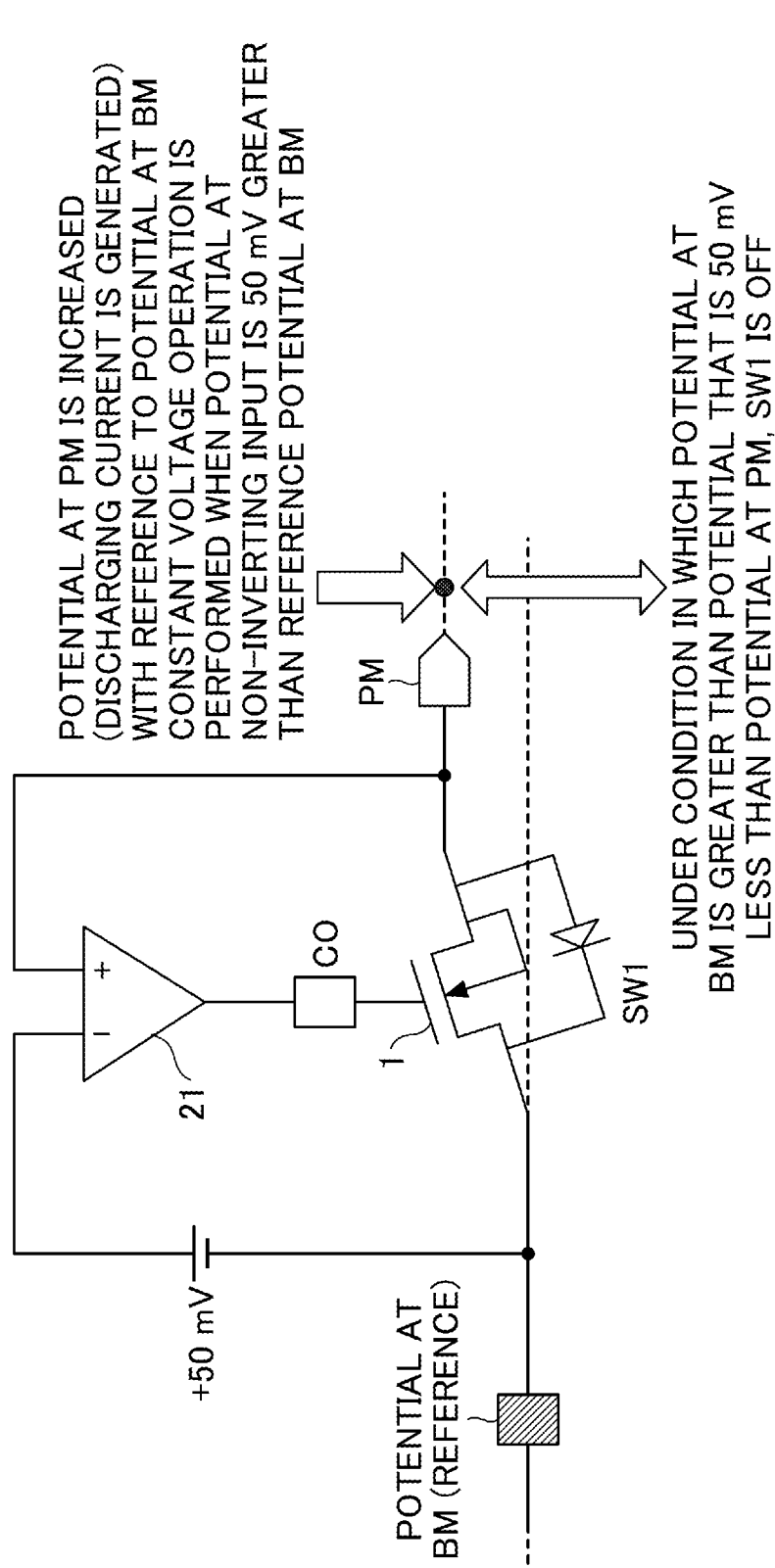

POTENTIAL AT PM IS INCREASED (DISCHARGING CURRENT IS GENERATED) WITH REFERENCE TO POTENTIAL AT BM CONSTANT VOLTAGE OPERATION IS PERFORMED WHEN POTENTIAL AT NON-INVERTING INPUT IS 50 mV GREATER THAN REFERENCE POTENTIAL AT BM

PM

UNDER CONDITION IN WHICH POTENTIAL AT BM IS GREATER THAN POTENTIAL THAT IS 50 mV LESS THAN POTENTIAL AT PM, SW1 IS OFF

SW1

CO

21

1

+50 mV

POTENTIAL AT BM (REFERENCE)

FIG.15

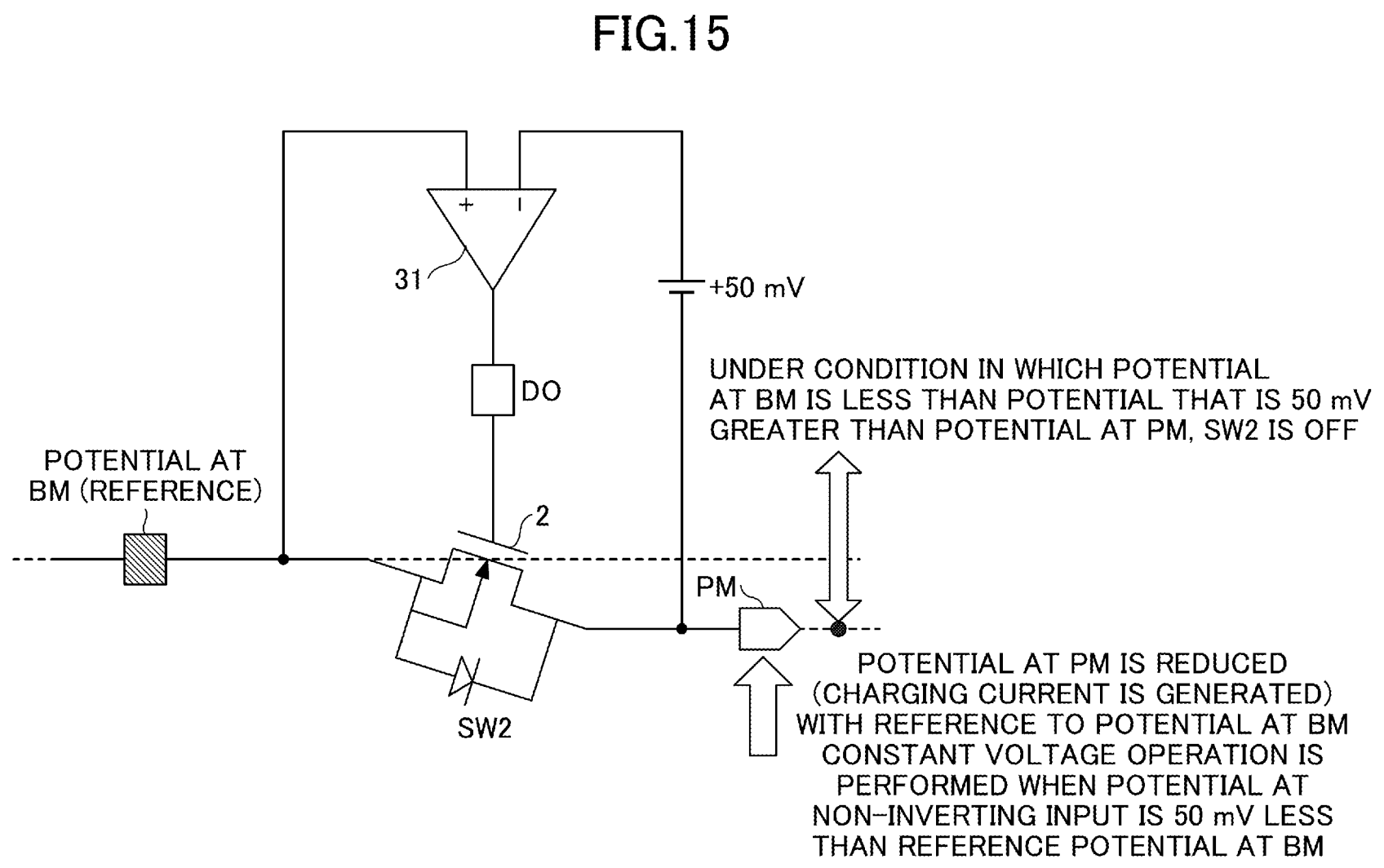

UNDER CONDITION IN WHICH POTENTIAL AT BM IS LESS THAN POTENTIAL THAT IS 50 mV GREATER THAN POTENTIAL AT PM, SW2 IS OFF

+50 mV

POTENTIAL AT PM IS REDUCED (CHARGING CURRENT IS GENERATED) WITH REFERENCE TO POTENTIAL AT BM CONSTANT VOLTAGE OPERATION IS PERFORMED WHEN POTENTIAL AT NON-INVERTING INPUT IS 50 mV LESS THAN REFERENCE POTENTIAL AT BM

PM

DO

31

2

SW2

POTENTIAL AT BM (REFERENCE)

FIG.16

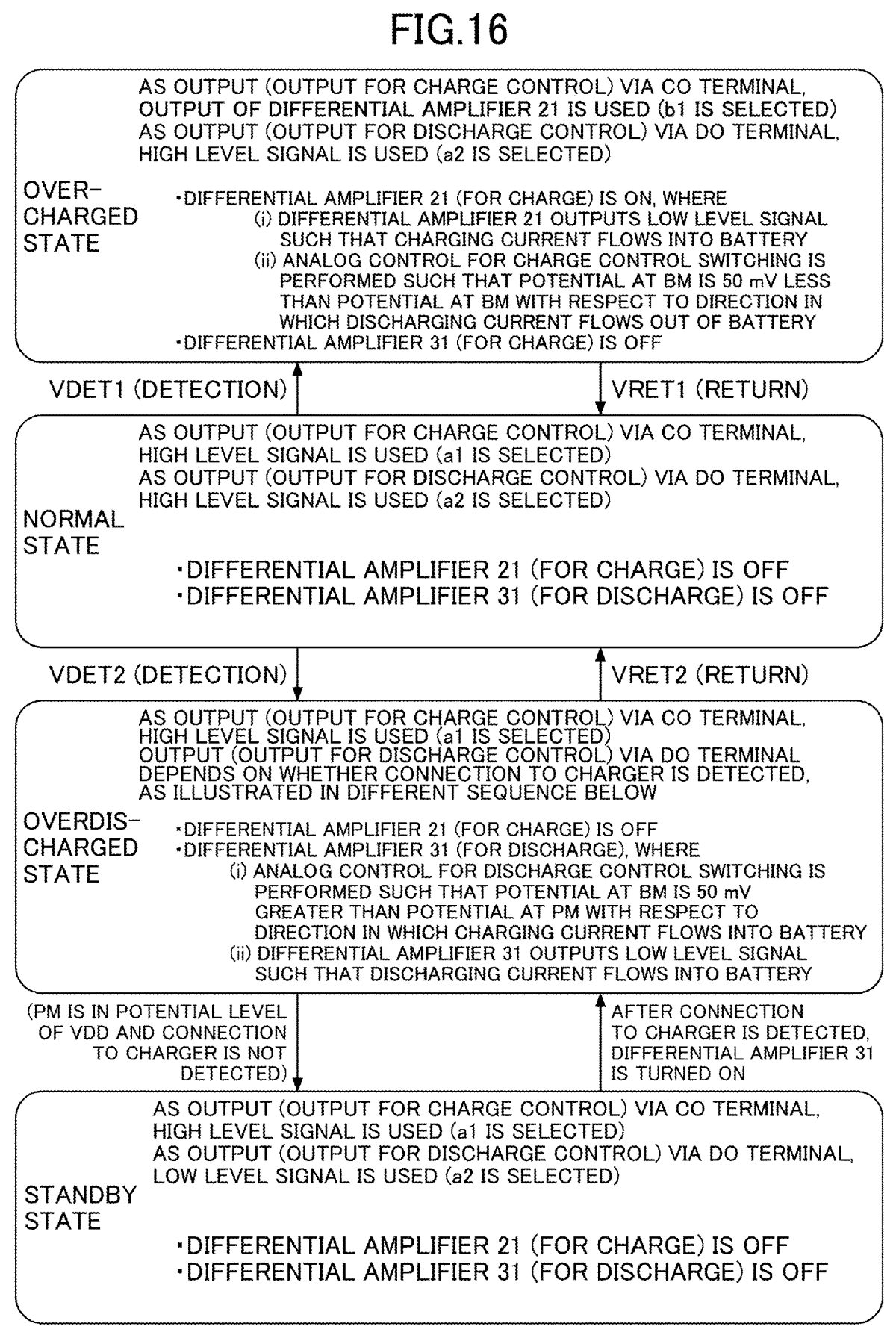

OVER-CHARGED STATE

AS OUTPUT (OUTPUT FOR CHARGE CONTROL) VIA CO TERMINAL, OUTPUT OF DIFFERENTIAL AMPLIFIER 21 IS USED (b1 IS SELECTED) AS OUTPUT (OUTPUT FOR DISCHARGE CONTROL) VIA DO TERMINAL, HIGH LEVEL SIGNAL IS USED (a2 IS SELECTED)

·DIFFERENTIAL AMPLIFIER 21 (FOR CHARGE) IS ON, WHERE
 (i) DIFFERENTIAL AMPLIFIER 21 OUTPUTS LOW LEVEL SIGNAL SUCH THAT CHARGING CURRENT FLOWS INTO BATTERY
 (ii) ANALOG CONTROL FOR CHARGE CONTROL SWITCHING IS PERFORMED SUCH THAT POTENTIAL AT BM IS 50 mV LESS THAN POTENTIAL AT BM WITH RESPECT TO DIRECTION IN WHICH DISCHARGING CURRENT FLOWS OUT OF BATTERY
·DIFFERENTIAL AMPLIFIER 31 (FOR CHARGE) IS OFF

VDET1 (DETECTION) ↑   ↓ VRET1 (RETURN)

NORMAL STATE

AS OUTPUT (OUTPUT FOR CHARGE CONTROL) VIA CO TERMINAL, HIGH LEVEL SIGNAL IS USED (a1 IS SELECTED) AS OUTPUT (OUTPUT FOR DISCHARGE CONTROL) VIA DO TERMINAL, HIGH LEVEL SIGNAL IS USED (a2 IS SELECTED)

·DIFFERENTIAL AMPLIFIER 21 (FOR CHARGE) IS OFF
·DIFFERENTIAL AMPLIFIER 31 (FOR DISCHARGE) IS OFF

VDET2 (DETECTION) ↓   ↑ VRET2 (RETURN)

OVERDIS-CHARGED STATE

AS OUTPUT (OUTPUT FOR CHARGE CONTROL) VIA CO TERMINAL, HIGH LEVEL SIGNAL IS USED (a1 IS SELECTED) OUTPUT (OUTPUT FOR DISCHARGE CONTROL) VIA DO TERMINAL DEPENDS ON WHETHER CONNECTION TO CHARGER IS DETECTED, AS ILLUSTRATED IN DIFFERENT SEQUENCE BELOW

·DIFFERENTIAL AMPLIFIER 21 (FOR CHARGE) IS OFF
·DIFFERENTIAL AMPLIFIER 31 (FOR DISCHARGE), WHERE
 (i) ANALOG CONTROL FOR DISCHARGE CONTROL SWITCHING IS PERFORMED SUCH THAT POTENTIAL AT BM IS 50 mV GREATER THAN POTENTIAL AT PM WITH RESPECT TO DIRECTION IN WHICH CHARGING CURRENT FLOWS INTO BATTERY
 (ii) DIFFERENTIAL AMPLIFIER 31 OUTPUTS LOW LEVEL SIGNAL SUCH THAT DISCHARGING CURRENT FLOWS INTO BATTERY (PM IS IN POTENTIAL LEVEL OF VDD AND CONNECTION TO CHARGER IS NOT DETECTED) ↓

AFTER CONNECTION TO CHARGER IS DETECTED, DIFFERENTIAL AMPLIFIER 31 IS TURNED ON ↑

STANDBY STATE

AS OUTPUT (OUTPUT FOR CHARGE CONTROL) VIA CO TERMINAL, HIGH LEVEL SIGNAL IS USED (a1 IS SELECTED) AS OUTPUT (OUTPUT FOR DISCHARGE CONTROL) VIA DO TERMINAL, LOW LEVEL SIGNAL IS USED (a2 IS SELECTED)

·DIFFERENTIAL AMPLIFIER 21 (FOR CHARGE) IS OFF
·DIFFERENTIAL AMPLIFIER 31 (FOR DISCHARGE) IS OFF

SECONDARY BATTERY PROTECTION CIRCUIT, BATTERY PACK, BATTERY SYSTEM, AND METHOD FOR PROTECTING SECONDARY BATTERY

CROSS-REFERENCE TO RELATED APPLICATION

This application claims priority under 35 U.S.C. § 119 to Japanese Patent Application No. 2021-080295, filed May 11, 2021, the contents of which are incorporated herein by reference in their entirety.

BACKGROUND

1. Technical Field

The present disclosure relates to a secondary battery protection circuit, a battery pack, a battery system, and a method for protecting a secondary battery.

2. Description of the Related Art

A conventional battery pack is known to incorporate an integrated circuit for secondary battery protection, and the integrated circuit protects a secondary battery from overdischarge or the like by turning a transistor off. The transistor is inserted in a current path between a negative electrode of the secondary battery and a negative terminal that is connected to a ground of a load or charger (see, for example, Patent Document 1).

RELATED-ART DOCUMENT

Patent Document

Patent document 1: Japanese Unexamined Patent Application Publication No. 2019-106870

In a configuration of a plurality of parallel connected battery packs each of which includes a secondary battery and a protection circuit, when a battery pack returns from an operating condition in which protection is performed against overcharge or overdischarge, an excessive current may be generated between secondary batteries of the parallel connected battery packs.

The present disclosure provides a secondary battery protection circuit, a battery pack, a battery system, and a method for protecting a secondary battery that can suppress an excessive current that flows between parallel connected secondary batteries.

SUMMARY

In one aspect of the present disclosure, a secondary battery protection circuit is provided. The secondary battery protection circuit is configured to be connected to a charge control transistor inserted in a charge path between an electrode of a secondary battery and a terminal for a load and a charger, the discharge control transistor being configured to interrupt the charge path such that the secondary battery is protected from overcharge, and a discharge control transistor inserted in a discharge path between the electrode of the secondary battery and the terminal, the discharge control transistor being configured to interrupt the discharge path such that the secondary battery is protected from overdischarge, the secondary battery protection circuit including:

an overcharge detection circuit configured to detect the overcharge of the secondary battery;

an overdischarge detection circuit configured to detect the overdischarge of the secondary battery;

a potential-difference detection circuit configured to output a potential-difference detection signal, based on a potential difference between the electrode and the terminal; and a potential-difference control circuit configured to provide, when the overcharge is detected by the overcharge detection circuit, a control terminal of the charge control transistor with feedback on the potential-difference detection signal to control the potential difference, or provide, when the overdischarge is detected by the overdischarge detection circuit, a control terminal of the discharge control transistor with feedback on the potential-difference detection signal to control the potential difference.

According to one aspect of the present disclosure, an excessive current that flows between secondary batteries can be suppressed in a configuration of the secondary batteries that are connected in parallel.

BRIEF DESCRIPTION OF THE DRAWINGS

FIG. 3 is a diagram illustrating an example of the configuration of the battery protection circuit according to the first embodiment;

FIG. 4 is a diagram illustrating an operational example of the battery system according to the first embodiment, the operational example being described for the battery voltages and system output obtained when both battery packs return from the overcharged state;

FIG. 6 is a diagram illustrating an operational example of the battery system according to the first embodiment, the operational example being described for the battery voltages and system output obtained when the battery pack of one side returns from the overcharged state;

FIG. 13 is a diagram illustrating an example of a starting condition of each differential amplifier;

FIG. 14 is a diagram for describing the operation of the differential amplifier that controls the charge control transistor in the overcharged state;

FIG. 15 is a diagram for describing the operation of the differential amplifier that controls the discharge control transistor in the overdischarged state;

FIG. 16 is a diagram illustrating state transition of the secondary battery protection circuit according to the first embodiment;

DETAILED DESCRIPTION

Embodiments of the present disclosure will be described below with reference to the drawings.

First Embodiment

Figure 1:
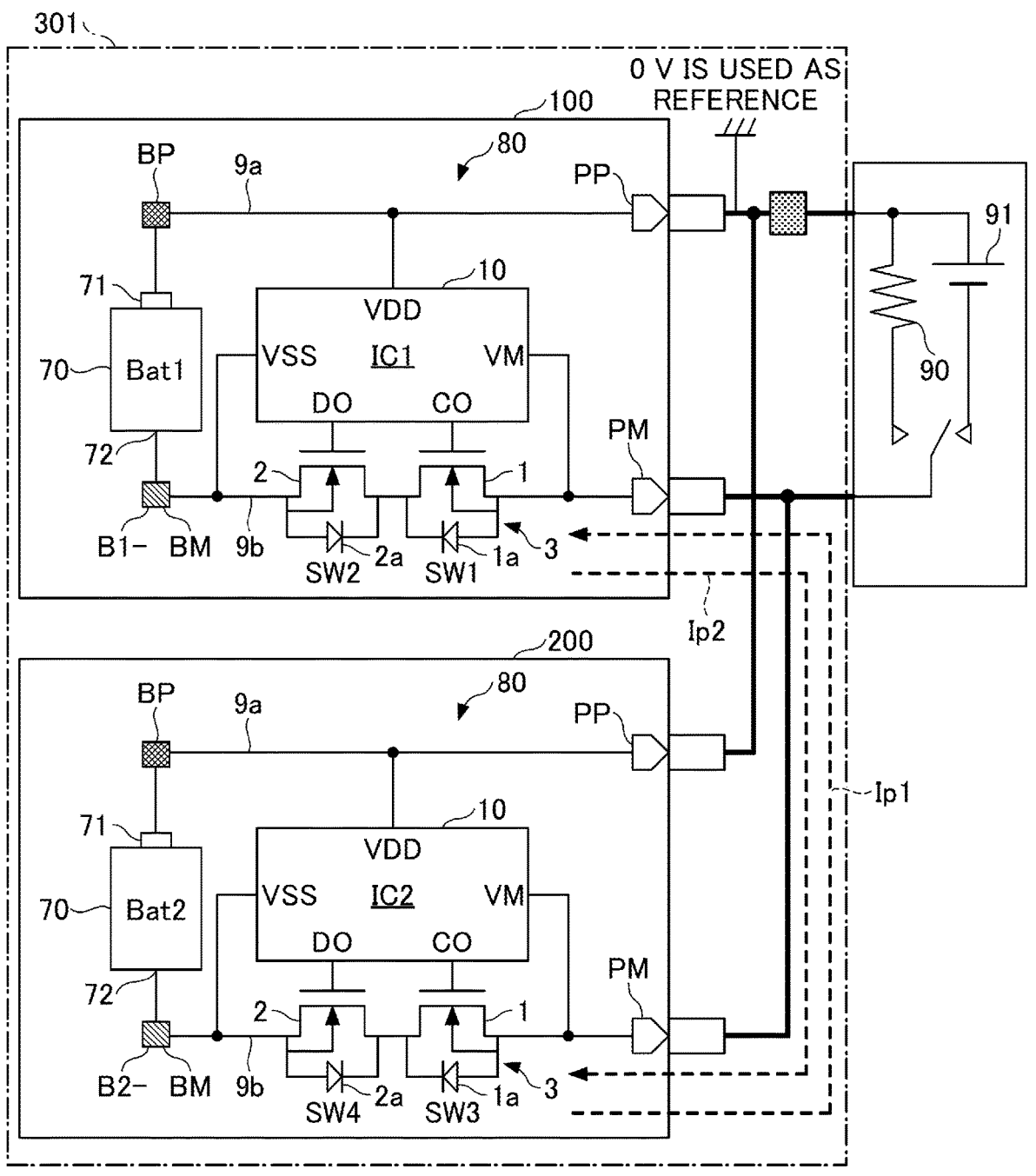
FIG. 1 is a diagram illustrating an example of the configuration of a battery system according to a first embodiment.

FIG. 1 is a diagram illustrating an example of the configuration of a battery system according to a first embodiment. FIG. 1 illustrates the example of the configuration of a battery system 301 to which a load 90 and a charger 91 are connected according to the first embodiment. The battery system 301 illustrated in FIG. 1 includes a plurality (in this example, two) of battery packs 100 and 200 that are connected in parallel. The battery pack 200 has the same configuration as the battery pack 100, and accordingly, description for the configuration of the battery pack 200 is omitted by reference to the description for the battery pack 100.

The battery pack 100 incorporates a secondary battery 70 and a battery protection device 80.

The secondary battery 70 is an example of a rechargeable battery. The secondary battery 70 supplies power to the load 90 that is connected between a terminal PP and a terminal PM. The secondary battery 70 can be charged by a charger 91 that is coupled between the terminal PP and the terminal PM. A specific example of the secondary battery 70 includes a lithium ion battery, a lithium polymer battery, or the like. The battery packs 100 and 200 may be embedded in the load 90, or may be implemented by external battery packs.

The load 90 is an example of a load that is powered by the secondary battery 70 in each of the battery packs 100 and 200. A specific example of the load 90 includes an electronic device such as a cellular phone, a smartphone, or a tablet. The load 90 is not limited to the above devices.

The battery protection device 80 is an example of a secondary battery protection device that operates with power that is supplied from the secondary battery 70 as a power source. By controlling the charge or discharge of the secondary battery 70, the battery protection device 80 protects the secondary battery 70 from overcharge, overdischarge, or the like. The battery protection device 80 includes the terminal PP, the terminal PM, a terminal BP, a terminal BM, a switching circuit 3, and a battery protection circuit 10.

The terminal PP is an example of a positive load-side terminal, and a high potential-side power supply terminal for the charger 91 and the load 90 is connected to the terminal PP. The terminal PM is an example of a negative-side load terminal, and a low potential-side power supply terminal for the load 90 and the charger 91 is connected to the terminal PM.

The terminal BP is an example of a positive battery electrode-side terminal and is connected to a positive electrode 71 of the secondary battery 70. The terminal BM is an example of a negative battery electrode-side terminal and is connected to a negative electrode 72 of the secondary battery 70.

The terminal BP and the terminal PP are connected to each other via a positive-side current path 9a. The positive-side current path 9a is a power supply path between the terminal BP and the terminal PP, and a charging current or a discharging current flows into the positive-side current path 9a. The positive-side current path 9a is an example of a charge-and-discharge current path between the positive electrode 71 of the secondary battery 70 and the terminal PP.

The terminal BM and the terminal PM are connected to each other via a negative-side current path 9b. The negative-side current path 9b is a current path between the terminal BM and the terminal PM, and the charging current or discharging current flows into the negative-side current path. The negative-side current path 9b is an example of a charge-and-discharge current path between the negative electrode 72 of the secondary battery 70 and the terminal PM.

A switching circuit 3 is inserted in the negative-side current path 9b between the terminal BM and the terminal PM. The switching circuit 3 includes, for example, a charge control transistor 1 and a discharge control transistor 2. The switching circuit 3 is a series circuit in which the charge control transistor 1 and the discharge control transistor 2 are connected in series. The charge control transistor 1 is an example of a charge-path interruption circuit that interrupts a charge path used for the secondary battery 70, and the discharge control transistor 2 is an example of a discharge-path interruption circuit that interrupts a discharge path used for the secondary battery 70. In FIG. 1, the charge control transistor 1 interrupts the current path 9b via which the charging current flows into the secondary battery 70, and the discharge control transistor 2 interrupts the current path 9b via which the discharging current flows out of the secondary battery 70. The transistors 1 and 2 are switching elements each of which switches between conduction and interruption of the current path 9b, and are inserted in the current path 9b. Each of the transistors 1 and 2 is, for example, an N-channel metal oxide semiconductor field effect transistor (MOS-FET).

The charge control transistor 1 includes a parasitic diode 1a between a drain and a source, and the parasitic diode 1a causes the current to flow in a forward direction opposite to a direction in which the charging current flows into the secondary battery 70. The charge control transistor 1 is a switching element that is inserted in the current path 9*b*, such that the forward direction of the parasitic diode 1*a* in the charge control transistor 1 coincides with the direction in which the discharging current flows out of the secondary battery 70.

The discharge control transistor 2 includes a parasitic diode 2*a* between a drain and a source, and the parasitic diode 2*a* causes current to flow in a forward direction opposite to the direction in which a discharging current flows out of the secondary battery 70. The discharge control transistor 2 is a switching element that is inserted in the current path 9*b*, such that the forward direction of the parasitic diode 2*a* in the discharge control transistor 2 coincides with the direction in which the charging current flows into the secondary battery 70.

The battery protection circuit 10 is an example of a secondary battery protection circuit. The battery protection circuit 10 operates with power that is supplied from the secondary battery 70 as a power source. The battery protection circuit 10 is, for example, an integrated circuit (IC) that operates with a battery voltage (hereinafter also referred to as a "cell voltage") that is supplied between a positive electrode 71 and a negative electrode 72 in the secondary battery 70.

The battery protection circuit 10 protects the secondary battery 70 from overdischarge or the like, by controlling the switching circuit 3. For example, the battery protection circuit 10 protects the secondary battery 70 from a charge abnormality (e.g., overcharge, an overcurrent (charge overcurrent) flowing in the charging direction, or the like) by turning the charge control transistor 1 off. In contrast, the battery protection circuit 10 protects the secondary battery 70 from a discharge abnormality (e.g., overdischarge, an overcurrent (discharge overcurrent) flowing in the discharging direction, or the like) by turning the discharge control transistor 2 off.

The battery protection circuit 10 includes, for example, a charge control terminal (terminal CO), a discharge control terminal (terminal DO), a monitor terminal (terminal VM), a power supply terminal (terminal VDD), and a ground terminal (terminal VSS). These terminals are external connection terminals that are used to connect an internal circuit of the battery protection circuit 10 to the outside of the battery protection circuit 10.

The terminal CO is connected to a gate (control terminal) of the charge control transistor 1, and a signal to turn on or off the charge control transistor 1 is output via the terminal CO. The terminal DO is connected to a gate (control terminal) of the discharge control transistor 2, and a signal to turn on or off the discharge control transistor 2 is output via the terminal DO.

The terminal VM is used to monitor a potential at the terminal PM and is connected to the terminal PM. The terminal VM is used by a detection circuit within the battery protection circuit 10 to, for example, monitor the presence or absence of a connection with the load 90 or the charger 91. The terminal VM is connected to a node in the negative-side current path 9*b* between the transistor 1 and the terminal PM.

The terminal VDD is a power supply terminal of the battery protection circuit 10 and is connected to the positive electrode 71 of the secondary battery 70, via the positive-side current path 9*a*. The terminal VSS is a ground terminal of the battery protection circuit 10 and is connected to the negative electrode 72 of the secondary battery 70, via negative-side current path 9*b*. The terminal VSS is connected to a node in the negative-side current path 9*b* between the transistor 2 and the terminal BM.

The battery protection circuit 10 monitors a power supply voltage Vd between the terminal VDD and the terminal VSS. The battery protection circuit 10 turns the charge control transistor 1 off when the power supply voltage Vd is detected to be higher than a predetermined overcharge detection voltage VDET1. The battery protection circuit 10 turns the charge control transistor 1 on when the power supply voltage Vd is detected to be lower than a predetermined overcharge return voltage VRET1. The battery protection circuit 10 turns the discharge control transistor 2 off when the power supply voltage Vd is detected to be lower than a predetermined overdischarge detection voltage VDET2. The battery protection circuit 10 turns the discharge control transistor 2 on when the power supply voltage Vd is detected to be higher than a predetermined overdischarge return voltage VRET2.

Hereafter, the operation performed when each of the battery packs 100 and 200 returns from an overcharged state will be described.

For the purpose of illustration, in the battery pack 100, the battery protection circuit 10, the charge control transistor 1, and the discharge control transistor 2 are expressed by IC1, SW1, and SW2, respectively. Likewise, in the battery pack 200, the battery protection circuit 10, the charge control transistor 1, and the discharge control transistor 2 are expressed by IC2, SW3, and SW4, respectively. Also, in the battery pack 100, Bat1 and B1- express the secondary battery 70 of the battery pack 100 and the terminal BM of the battery pack 100, respectively. In the battery pack 200, Bat2 and B2- express the secondary battery 70 of the battery pack 200 and terminal BM of the battery pack 200, respectively.

Figure 2:
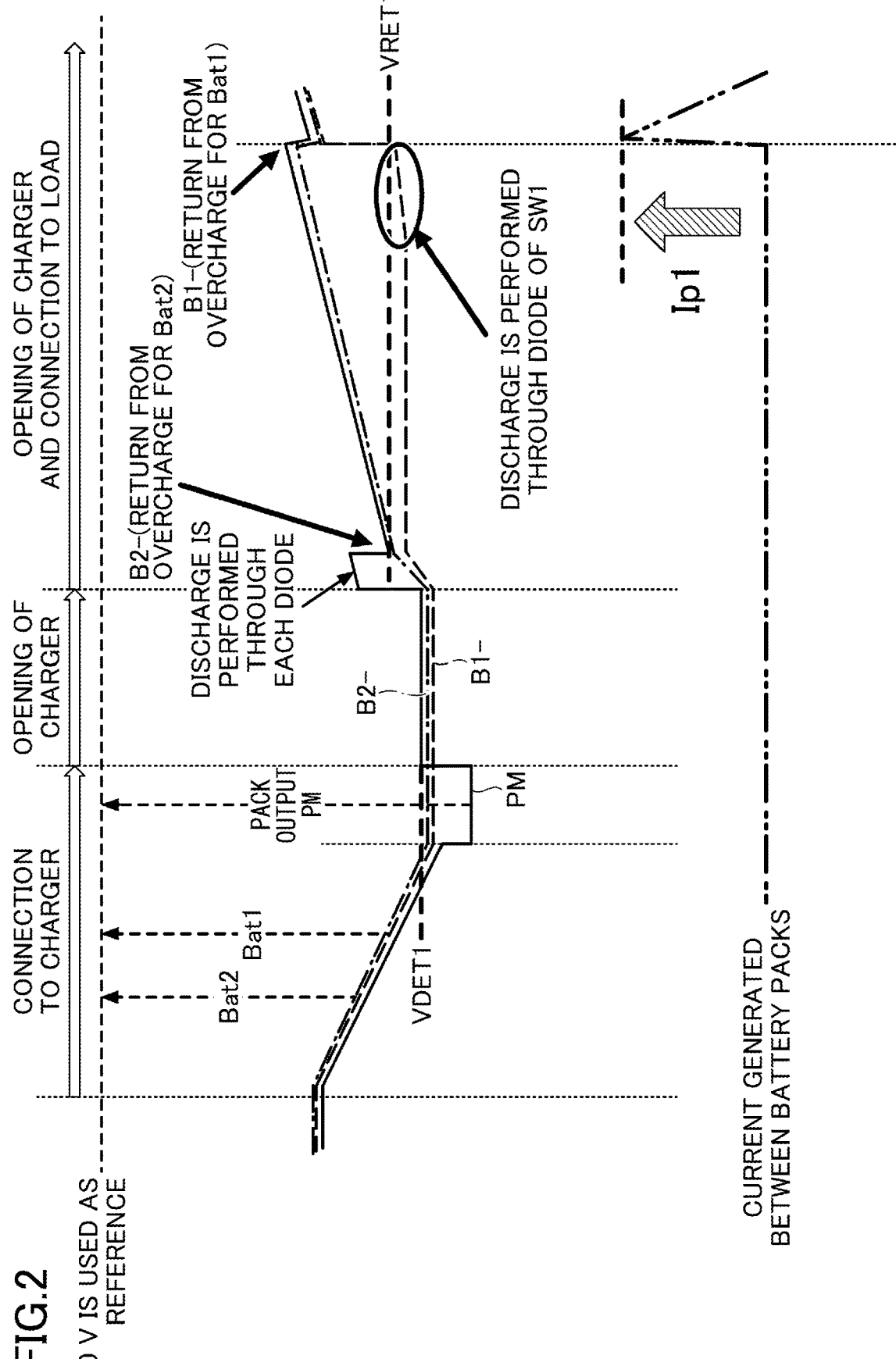
FIG. 2 is a diagram illustrating a comparative operational example of the battery system, the comparative operational example being described for battery voltages and system output obtained when both battery packs return from an overcharged state.

FIG. 2 is a diagram illustrating a comparative operational example of the battery system, the comparative operational example being described for battery voltages and system output obtained when both the battery packs 100 and 200 return from an overcharged state. In FIG. 2, the battery voltages and system output are each shown with reference to 0 volts at the terminal PP.

When the secondary batteries 70 of the respective battery packs 100 and 200 are overcharged, the power supply voltages Vd are each detected to be higher than the predetermined overcharge detection voltage VDET1, and thus IC1 turns the SW1 off and the IC2 turns the SW3 off.

In order for both the battery packs 100 and 200 to return to a normal state from an overcharged state, it is necessary to discharge the secondary battery 70 of the battery pack 100 via the diode 1*a* of the SW1 and to discharge the secondary battery 70 of the battery pack 200 via a diode 1*a* of the SW3. If the SW1 and SW3 are off, and the battery packs are overcharged, the secondary batteries 70 can be discharged via the diodes 1*a*, respectively. However, if battery voltages are reduced, the secondary battery 70 of the battery pack 200 first returns from the overcharged state, and thus only the SW3 is turned on. Therefore, although only the secondary battery 70 of the battery pack 200 that has returned from the overcharge starts discharging, the secondary battery 70 of the battery pack 100 in the overcharged state cannot be discharged via the diode 1*a* of the SW1.

When the discharge is maintained, the output voltage of the battery pack 200 is reduced, and then the secondary battery 70 of the battery pack 100 in the overcharged state can be also discharged via the diode 1*a* of the SW1. With this arrangement, the voltage of the secondary battery 70 in the battery pack 100 is reduced, and when the IC1 detects that the power supply voltage Vd is lower than the overcharge return voltage VRET1, the IC1 turns the SW1 off. Thus, the secondary battery 70 of the battery pack 100 returns from the overcharge.

At this time, a potential difference between the voltage of the battery pack 200, which returns from the overcharge first, and the voltage of the battery pack 100, which returns from the overcharge next, corresponds to a potential difference allowing the discharge through the diode. Thus, an excessive current Ip1 is generated between the battery pack 100 and the battery pack 200, at a timing at which the battery pack 100 returns from the overcharge. For example, when a total sum of resistance between batteries is 50 mΩ, and a forward voltage VF of each diode is 0.7 V, the magnitude of the current Ip1 that flows from the terminal PM of the battery pack 200 into the terminal PM of the battery pack 100 is about 14 A.

Figure 4:
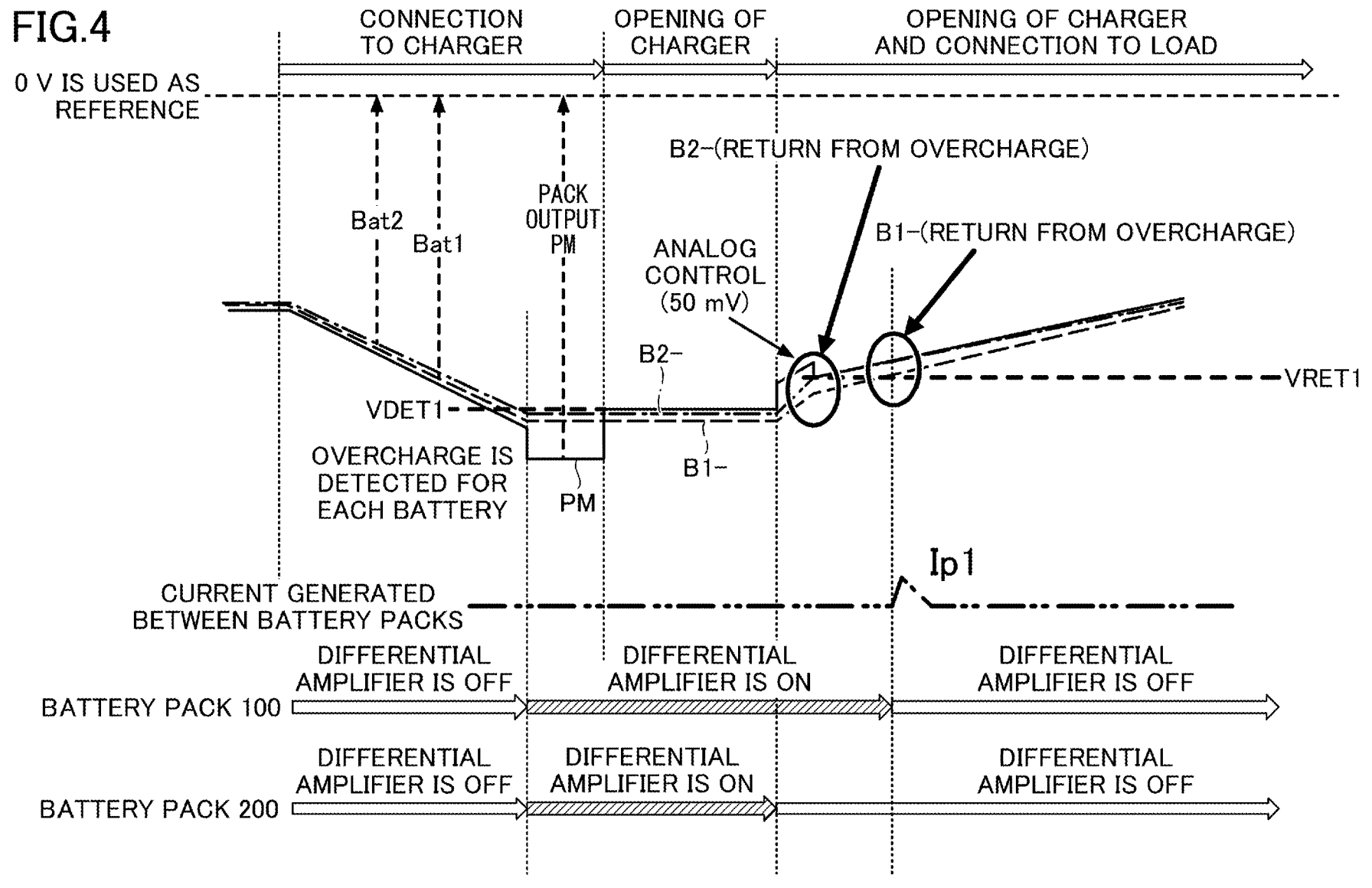

FIG. 3 is a diagram illustrating an example of the configuration of a battery protection circuit 10A according to the first embodiment. FIG. 4 is a diagram illustrating an operational example of the battery system according to the first embodiment, the operational example being described for the battery voltages and system output obtained when both battery packs 100 and 200 return from the overcharged state. In FIG. 4, the battery voltages and system output are each shown with reference to 0 volts at the terminal PP.

Until the power supply voltage Vd is reduced to be lower than the overcharge return voltage VRET1 after the power supply voltage Vd exceeds the overcharge detection voltage VDET1, the battery protection circuit 10A controls the charge control transistor 1 is in a saturated region such that the potential difference between the terminal B1- and the terminal PM is maintained constant with respect to a direction in which the charging current flows. With this arrangement, when the battery pack 200 returns from the overcharged state, and then the battery pack 100 returns from the overcharged state, the difference in the battery voltage between the battery pack 200 and the battery pack 100 can be reduced. Therefore, the current Ip1 generated between the batteries, upon returning of the battery packs, can be suppressed. For example, if a total sum of resistance between the batteries is 50 mΩ, and a potential difference controlled by each differential amplifier 21 is 50 mV, the magnitude of the current Ip1 is reduced to about 1 A.

When the overcharged state in which the power supply voltage Vd is higher than the overcharge detection voltage VDET1 is detected, the battery protection circuit 10A causes the current in the discharge direction to flow into the charge control transistor 1, while maintaining, at a fixed value (e.g., 50 mV), a difference obtained by subtracting the potential at the terminal VSS from the potential at the terminal VM. With this arrangement, discharging of the secondary battery 70 can be facilitated.

Figure 5:
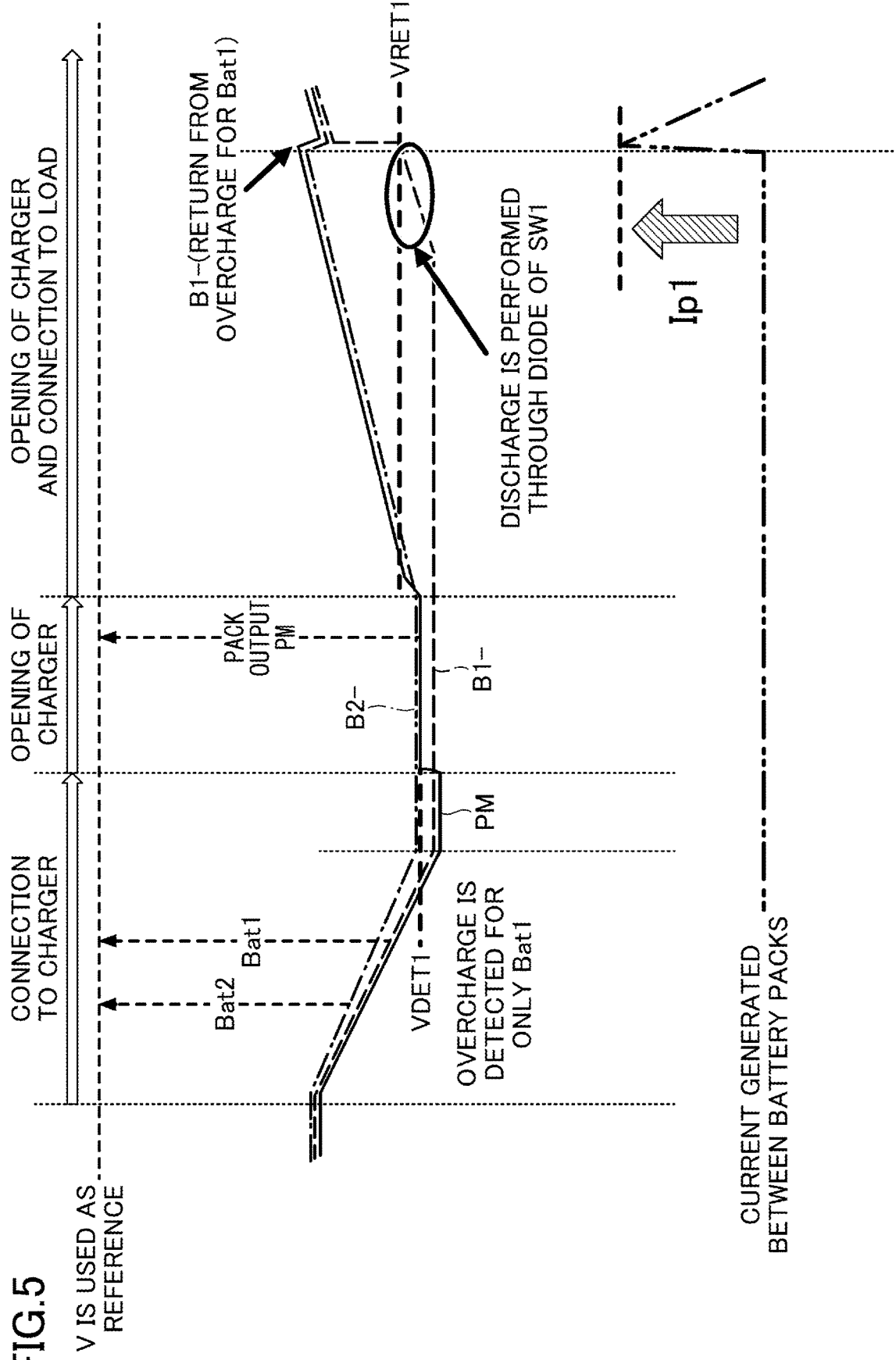
FIG. 5 is a diagram illustrating a comparative operational example of the battery system, the comparative operational example being described for the battery voltages and system output obtained when a battery pack of one side returns from the overcharged state.

FIG. 5 is a diagram illustrating a comparative operational example of the battery system, the comparative operational example being described for the battery voltages and system output obtained when the battery pack 100 of one side returns from the overcharged state. In FIG. 5, the battery voltages and system output are each shown with reference to 0 volts at the terminal PP.

When only the secondary battery 70 of the battery pack 100 is overcharged, the power supply voltage Vd is detected to be higher than a predetermined overcharge detection voltage VDET1, and thus the IC1 turns the SW1 off (the IC2 maintains SW3 on).

In order for the battery pack 100 in the overcharged state to return to the normal state, it is necessary to discharge the secondary battery 70 of the battery pack 100 via the diode 1a of the SW1. As in a case where both batteries return from the overcharged state, when the output voltage of the battery pack 200 is reduced by the forward voltage of a given diode in comparison to the battery voltage of the battery pack 100, and thus the power supply voltage Vd of the battery pack 100 is lower than the overcharge return voltage VRET1, the battery pack 100 returns from the overcharge.

With this arrangement, when the battery pack 100 returns from the overcharged state, an excessive current Ip1 is generated between the battery packs at a timing at which the battery pack 100 returns from the overcharge, because a potential difference allowing the charging through the diode occurs between the battery pack 100 and the battery pack 200.

FIG. 6 is a diagram illustrating an operational example of the battery system according to the first embodiment, the operational example being described for the battery voltages and system output obtained when the battery pack 100 of one side returns from the overcharged state. In FIG. 6, the battery voltages and system output are each shown with reference to 0 volts at the terminal PP.

Until the power supply voltage Vd is reduced to be lower than the overcharge return voltage VRET1 after the power supply voltage Vd exceeds the overcharge detection voltage VDET1, the battery protection circuit 10A of the battery pack 100 controls the charge control transistor 1 in the saturated region, such that a potential difference between the terminal BM and the terminal PM is maintained constant with respect to the direction in which the discharging current flows. With this arrangement, when the battery pack 100 returns from the overcharged state, the difference in the battery voltage between the battery pack 200 and the battery pack 100 can be reduced. Therefore, the current Ip1 generated between the batteries, during returning of the battery pack 100, can be suppressed.

Hereafter, the operation performed when both the battery packs 100 and 200 return from the overdischarged state will be described.

Figure 7:
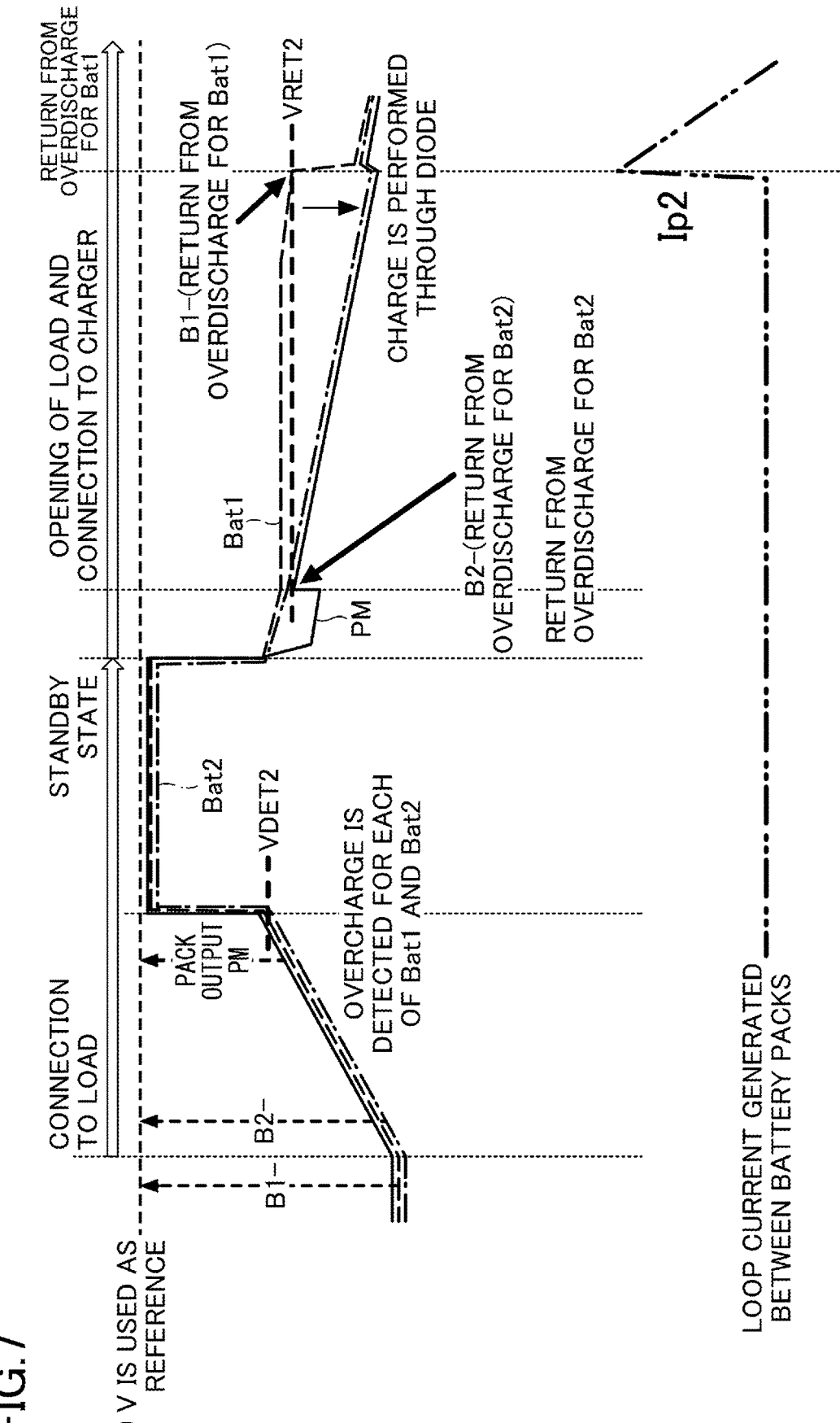
FIG. 7 is a diagram illustrating a comparative operational example of the battery system, the comparative operational example being described for the battery voltages and system output obtained when both battery packs return from an overdischarged state.

FIG. 7 is a diagram illustrating a comparative operational example of the battery system, the comparative operational example being described for the battery voltages and system output obtained when both the battery packs 100 and 200 return from the overdischarged state. In FIG. 7, the battery voltages and system output are each shown with reference to 0 volts at the terminal PP.

When the secondary batteries 70 of the respective battery packs 100 and 200 are overdischarged, the power supply voltages Vd are each detected to be lower than a predetermined overdischarge detection voltage VDET2, and thus the IC1 turns the SW2 off and the IC2 turns the SW4 off.

In order for the battery packs 100 and 200 in the overcharged state to return to the normal state, it is necessary to charge the secondary battery 70 of the battery pack 100 via the diode 2a of the SW2 and to charge the secondary battery 70 of the battery pack 200 via the diode 2a of the SW4. If both the SW2 and the SW4 are off, and the battery packs 100 and 200 are overdischarged, the secondary batteries 70 can be charged via the diodes 2a, respectively. However, when the battery voltages are increased, the secondary battery 70 of the battery pack 200 first returns from the overdischarge, and thus only the SW4 is turned on. In this case, although only the secondary battery 70 of the battery pack 200 that has returned to the normal state starts charging, the secondary battery 70 of the battery pack 100 in the overcharged state cannot be charged via the diode 2a of the SW2.

When the charge is maintained, the output voltage of the battery pack 200 is increased, and thus the secondary battery 70 of the battery pack 100 in the overcharged state can also be charged via the diode 1a of the SW2. With this arrangement, when the voltage across the secondary battery 70 of the battery pack 100 is increased, the IC1 detects that the power supply voltage Vd is higher than the overdischarge return voltage VRET2, and thus the IC1 turns the SW2 off. Therefore, the secondary battery 70 of the battery pack 100 returns from the overdischarge. In this case, even when the charger 91 is connected to a given secondary battery, the output voltage of the battery pack is increased.

At this time, the potential difference between the voltage across the battery pack 200, which returns from the overcharge first, and the voltage across the battery pack 100, which returns from the overcharge next, corresponds to a potential difference allowing the discharge through the diode, and thus an excessive current Ip2 is generated between the battery pack 100 and the battery pack 200, at a timing at which the battery pack 100 returns from the overdischarge. For example, when a total sum of resistance between the batteries is 50 m$\Omega$, and the forward voltage VF of each diode is 0.7 V, the magnitude of the current Ip2 flowing from the terminal PM of the battery pack 100 into the terminal PM of the battery pack 200 is about 14 A.

Figure 8:
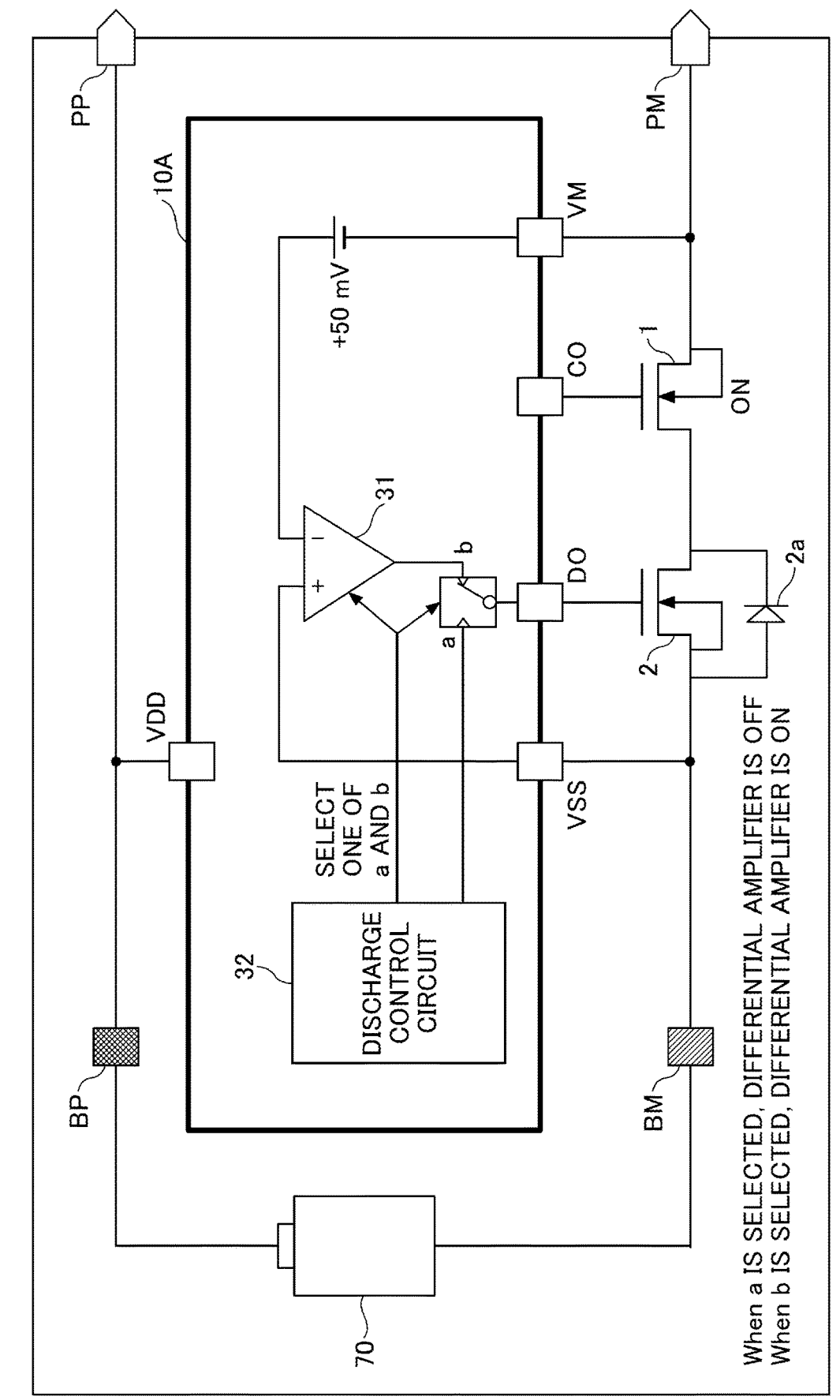
FIG. 8 is a diagram illustrating an example of the configuration of the battery protection circuit according to the first embodiment.
Figure 9:
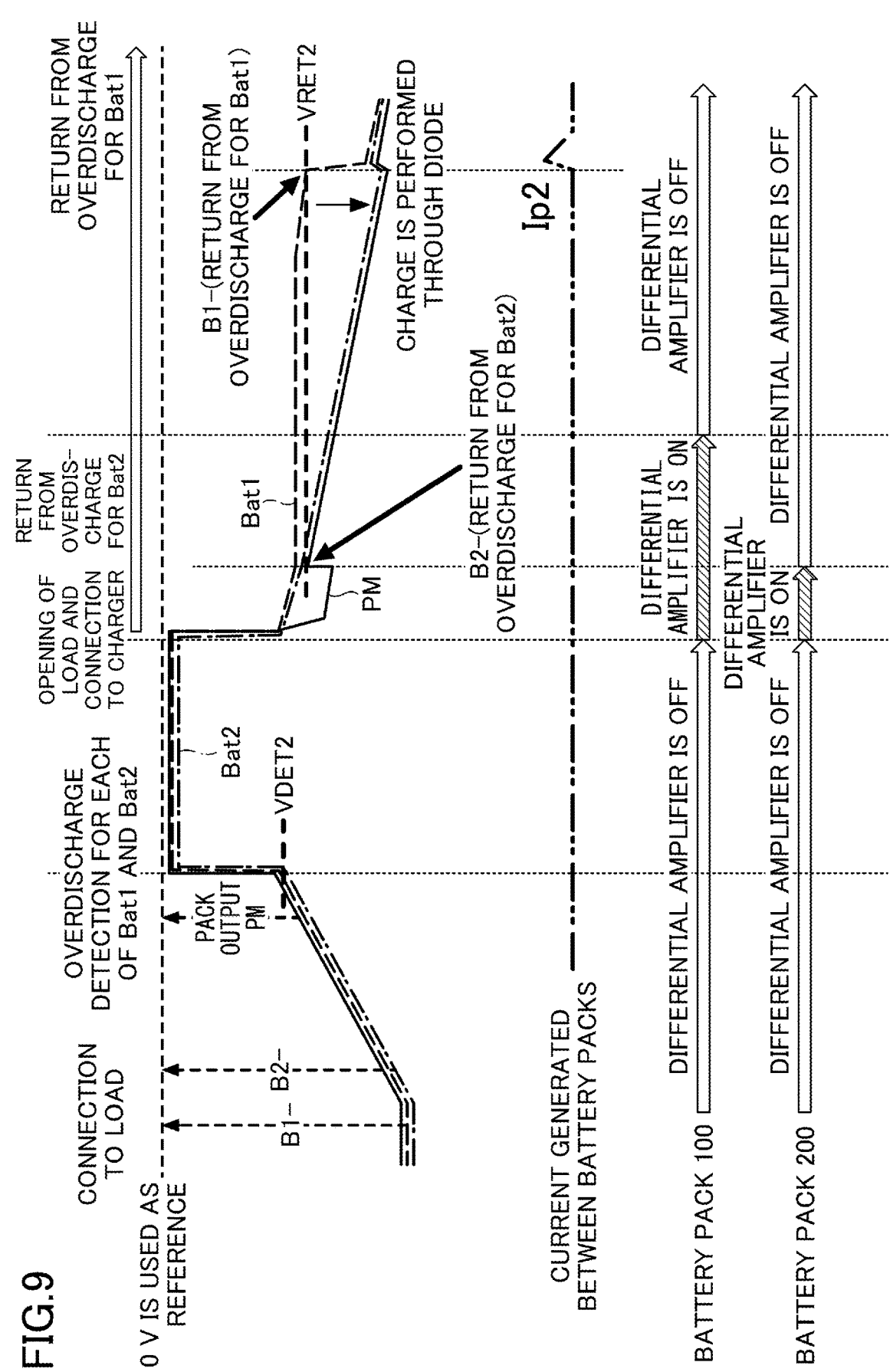
FIG. 9 is a diagram illustrating an operational example of the battery system according to the first embodiment, the operational example being described for the battery voltages and system output obtained when both battery packs return from the overdischarged state.

FIG. 8 is a diagram illustrating an example of the configuration of the battery protection circuit 10A according to the first embodiment. FIG. 9 is a diagram illustrating an operational example of the battery system according to the first embodiment, the operational example being described for the battery voltages and system output obtained when both the battery packs 100 and 200 return from the overdischarged state. In FIG. 9, the battery voltages and system output are each shown with reference to 0 volts at the terminal PP.

Until the power supply voltage Vd is higher than the overdischarge return voltage VRET2 after the power supply voltage Vd is lower than the overdischarge detection voltage VDET2, each battery protection circuit 10A controls the discharge control transistor 2 in the saturated region, such that the potential difference between the terminal B1- and the terminal PM is maintained constant with respect to the direction in which the charging current flows. With this arrangement, when the battery pack 200 returns from the overdischarged state, and then the battery pack 100 returns from the overdischarged state, the difference in the battery voltage between the battery pack 200 and the battery pack 100 can be reduced. Therefore, the current Ip2 generated between the batteries, during returning of the battery packs 100 and 200, can be suppressed. For example, when a total sum of resistance between the batteries is 50 m$\Omega$, and a potential difference controlled by each differential amplifier 31 is 50 mV, the magnitude of the current Ip2 is reduced to about 1 A.

When the overdischarged state in which the power supply voltage Vd is lower than the overdischarge detection voltage VDET2 is detected, each battery protection circuit 10A causes the current in the charging direction to flow into the discharge control transistor 2 while maintaining, at a fixed value (for example, 50 mV), a difference obtained by subtracting the potential at the terminal VM from the potential at the terminal VSS. With this arrangement, charging of each secondary battery 70 can be facilitated.

Figure 10:
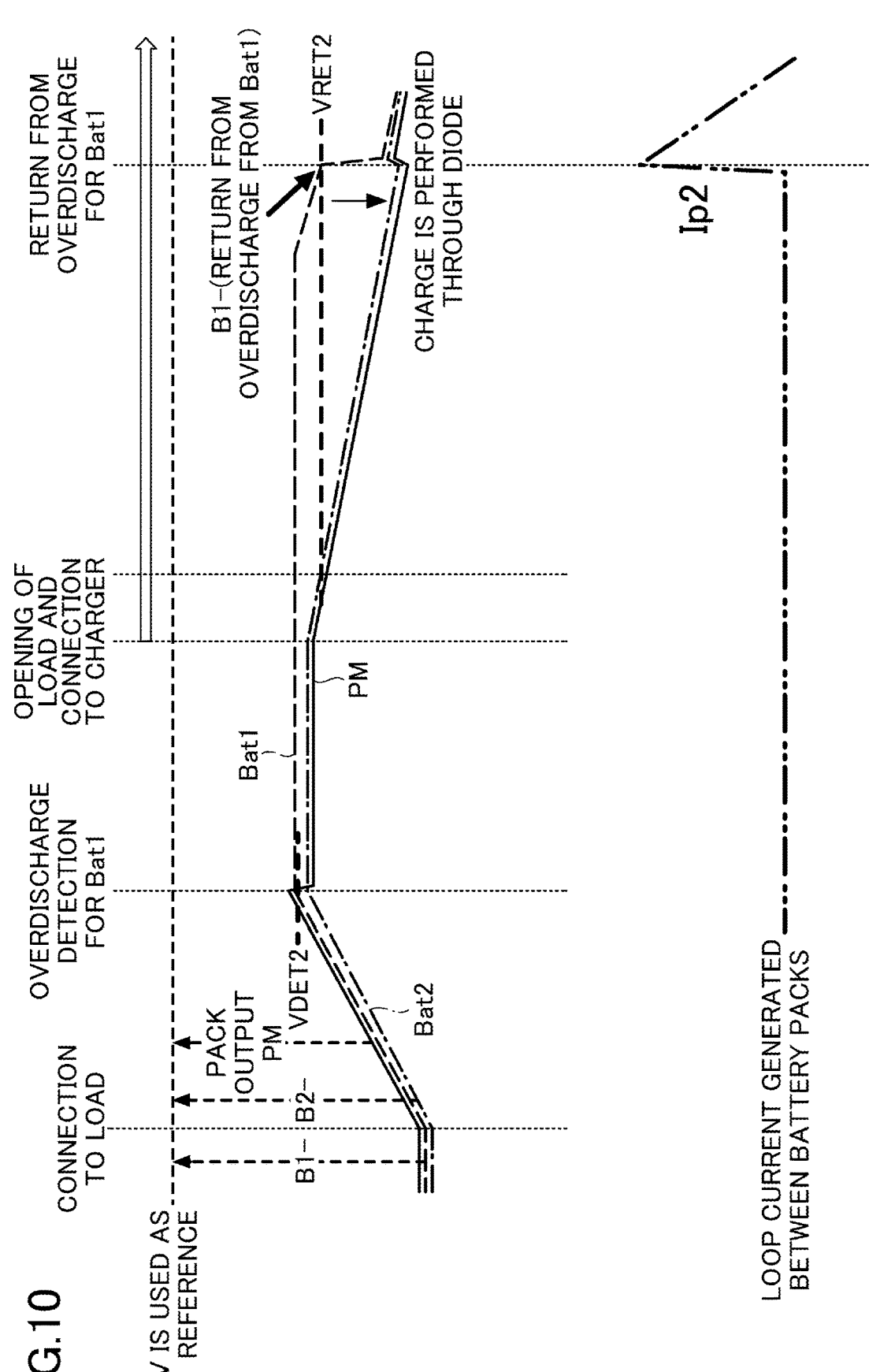
FIG. 10 is a diagram illustrating a comparative operational example of the battery system, the comparative operational example being described for the battery voltages and system output obtained when the battery pack of one side returns from the overdischarged state.

FIG. 10 is a diagram illustrating a comparative operational example of the battery system, the comparative operational example being described for the battery voltages and system output obtained when the battery pack 100 of one side returns from the overdischarged state. In FIG. 10, the battery voltages and system output are each shown with reference to 0 volts at the terminal PP.

When only the secondary battery 70 of the battery pack 100 is overdischarged, and the power supply voltage Vd is detected to be lower than the predetermined overdischarge detection voltage VDET2, and thus the IC1 turns the SW2 off (the IC2 maintains the SW4 on).

In order for the battery pack 100 in the overdischarged state to return to the normal state, it is necessary to charge the secondary battery 70 of the battery pack 100 via the diode 2a of the SW2. As in a case where both batteries return from the overdischarged state, if the output voltage of the battery pack 200 is increased by the forward voltage of the diode in comparison to the battery voltage of the battery pack 100, and the power supply voltage Vd of the battery pack 100 is higher than the overdischarge return voltage VRET2, the battery pack 100 returns from the overdischarge.

With this arrangement, when the battery pack 100 returns from the overdischarged state, an excessive current Ip2 is generated between the battery packs at a timing at which the battery pack 100 returns from the overdischarge, because a potential difference allowing the discharging through the diode occurs between the battery pack 100 and the battery pack 200.

Figure 11:
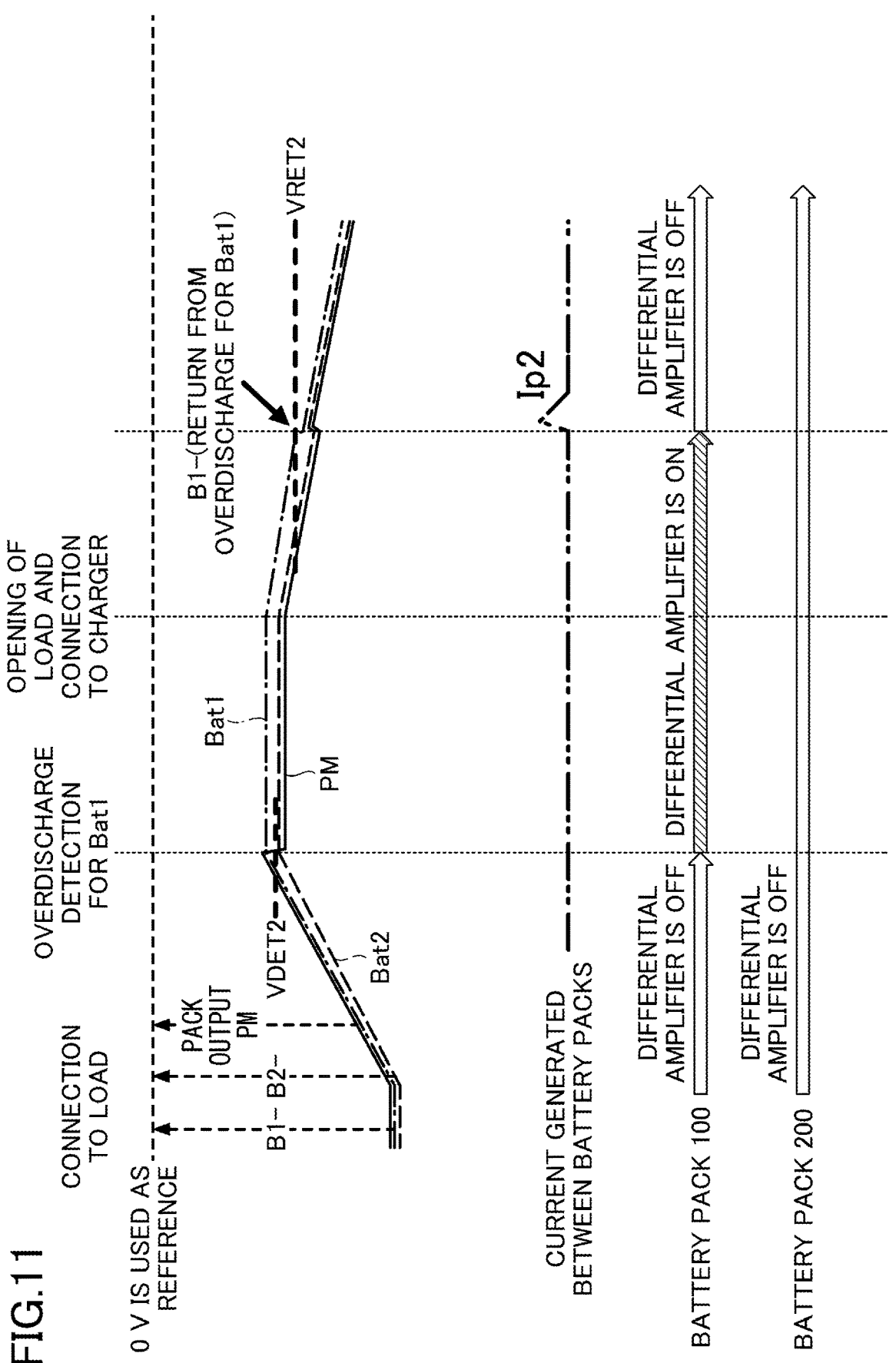
FIG. 11 is a diagram illustrating an operational example of the battery system according to the first embodiment, the operational example being described for the battery voltages and system output obtained when the battery pack of one side returns from the overdischarged state.

FIG. 11 is a diagram illustrating an operational example of the battery system according to the first embodiment, the operational example being described for the battery voltages and system output obtained when the battery pack 100 of one side returns from the overdischarged state. In FIG. 11, the battery voltages and system output are each shown with reference to 0 volts at the terminal PP.

Until the power supply voltage Vd becomes higher than the overcharge return voltage VRET2 after the power supply voltage Vd is lower than the overdischarge detection voltage VDET2, the battery protection circuit 10A of the battery pack 100 controls the discharge control transistor 2 in the saturated region, such that the potential difference between the terminal BM and the terminal PM is maintained constant with respect to the direction in which the charging current flows. With this arrangement, when the battery pack 100 returns from the overdischarged state, the difference in the battery voltage between the battery pack 200 and the battery pack 100 can be reduced. Therefore, the current Ip2 generated between the batteries, during returning of the battery pack 100, can be suppressed.

Figure 12:
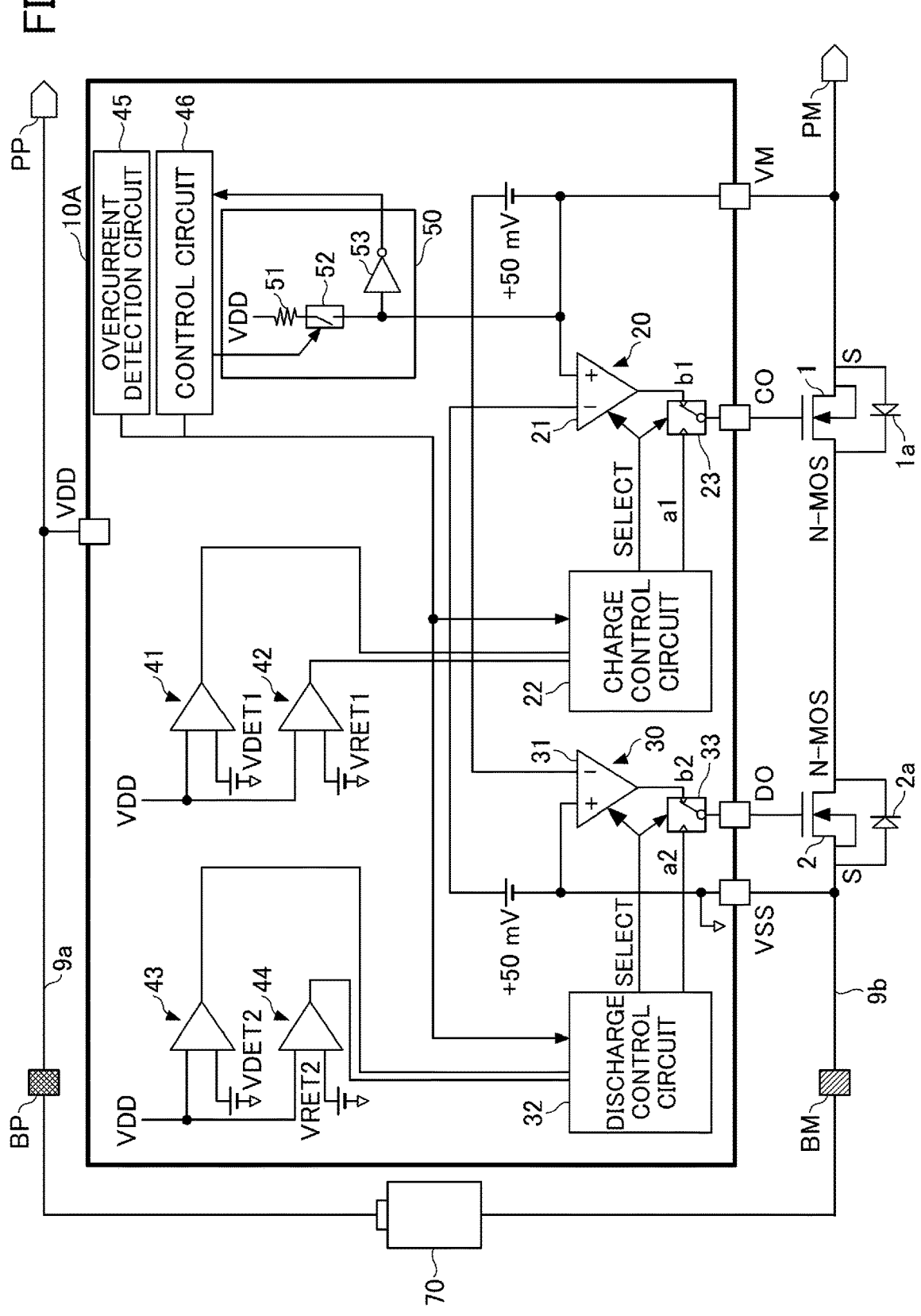
FIG. 12 is a diagram illustrating an example of a more detailed configuration of the battery protection circuit according to the first embodiment.

FIG. 12 is a diagram illustrating an example of a more detailed configuration of the battery protection circuit 10A according to the first embodiment. The battery protection circuit 10A includes an overcharge detection circuit 41, an overcharge-return detection circuit 42, an overdischarge detection circuit 43, an overdischarge-return detection circuit 44, and an overcurrent detection circuit 45.

When the power supply voltage Vd is detected to be higher than a predetermined overcharge detection voltage VDET1, the overcharge detection circuit 41 outputs an overcharge detection signal indicating that the power supply voltage Vd is detected to be higher than the overcharge detection voltage VDET1. When the power supply voltage Vd is detected to be lower than a predetermined overcharge return voltage VRET1, the overcharge-return detection circuit 42 outputs an overcharge-return detection signal indicating that the power supply voltage Vd is detected to be lower than the overcharge return voltage VRET1. The overcharge detection voltage VDET1 is a threshold used to detect overcharge, and the overcharge return voltage VRET1 is a threshold used to detect a return from the overcharge. The overcharge return voltage VRET1 is set to a voltage magnitude that is less than the overcharge detection voltage VDET1.

When the power supply voltage Vd is detected to be lower than a predetermined overdischarge detection voltage VDET2, the overdischarge detection circuit 43 outputs an overdischarge detection signal indicating that the power supply voltage Vd is detected to be lower than the overdischarge detection voltage VDET2. When the power supply voltage Vd is detected to be higher than a predetermined overdischarge detection voltage VDET2, the overdischarge-return detection circuit 44 outputs an overdischarge-return detection signal indicating that the power supply voltage Vd is detected to be higher than the overdischarge detection voltage VDET2. The overdischarge detection voltage VDET2 is a threshold used to detect overdischarge, and the overdischarge return voltage VRET2 is a threshold used to detect a return from the overdischarge. The overdischarge return voltage VRET2 is set to a voltage magnitude that is greater than the overdischarge detection voltage VDET2.

The overcurrent detection circuit 45 monitors a monitored voltage VI, which is a voltage between the terminal VM and the terminal VSS, to thereby detect an overcurrent flowing between the terminal PM and the terminal BM.

The overcurrent detection circuit 45 includes a discharge-overcurrent detection circuit that outputs a discharge-overcurrent detection signal indicating that the discharge overcurrent is detected when the monitored voltage VI is detected to be higher than a predetermined discharge-overcurrent detection voltage VDET3. The overcurrent detection circuit 45 includes a discharge-overcurrent return detection circuit that outputs a discharge-overcurrent return detection signal indicating that the discharge overcurrent does not flow when the monitored voltage VI is detected to be lower than the predetermined discharge-overcurrent return voltage VRET3. The discharge-overcurrent detection voltage VDET3 is a threshold used to detect the discharge overcurrent, and the discharge-overcurrent return voltage VRET3 is a threshold used to detect a return from a condition in which the discharge overcurrent flows.

The overcurrent detection circuit 45 includes a charge-overcurrent detection circuit that outputs a charge-overcurrent detection signal indicating that the charge overcurrent is detected, when the monitored voltage VI is detected to be lower than or equal to a predetermined charge-overcurrent detection voltage VDET4. The overcurrent detection circuit 45 includes a charge-overcurrent return detection circuit that outputs a charge-overcurrent return detection signal indicating that the charge overcurrent does not flow when the monitored voltage VI is detected to be higher than the predetermined charge-overcurrent return voltage VRET4. The charge-overcurrent detection voltage VDET4 is a threshold used to detect the charge overcurrent, and the charge-overcurrent return voltage VRET4 is a threshold used to detect a return from a condition in which the charge overcurrent flows.

The battery protection circuit 10A includes a differential amplifier 21, a differential amplifier 31, a first potential-difference control circuit 20, and a second potential-difference control circuit 30.

The differential amplifier 21 is an example of a first potential-difference detection circuit, and outputs a first potential-difference detection signal b1 in accordance with a potential difference $\Delta 1$ between the terminal BM and the terminal PM (between the terminal VSS and the terminal VM). The differential amplifier 31 is an example of a second potential-difference detection circuit, and outputs a second potential-difference detection signal b2 in accordance with a potential difference $\Delta 2$ between the terminal BM and the terminal PM (between the terminal VSS and the terminal VM).

When overcharge is detected by the overcharge detection circuit 41, the first potential-difference control circuit 20 transmits, as feedback, the first potential-difference detection signal b1 to the control terminal of the charge control transistor 1, and then controls the potential difference $\Delta 1$ such that the current in the discharging direction of the secondary battery 70 flows into the charge control transistor 1. With this arrangement, as described above, the potential difference $\Delta 1$ can be adjusted to a value that is less than the forward voltage of the diode 1a, when the secondary battery is in the overcharged state. Therefore, an excessive current Ip1 generated during returning of a given battery pack can be suppressed.

When overdischarge is detected by the overdischarge detection circuit 43, the second potential-difference control circuit 30 transmits, as feedback, a second potential-difference detection signal b2 to the control terminal of the discharge control transistor 2, and then controls a potential difference $\Delta 2$ such that the current in the charging direction of the secondary battery 70 flows into the discharge control transistor 2. With this arrangement, as described above, the potential difference $\Delta 2$ can be controlled to a value that is less than the forward voltage of the diode 2a, in an overdischarged state. Therefore, an excessive current Ip2 generated during returning of battery packs can be suppressed.

The battery protection circuit 10A includes a charge control circuit 22 and a first switching circuit 23. When overcharge is not detected by the overcharge detection circuit 41, the charge control circuit 22 outputs a charge control signal a1 to control the charge control transistor 1, to the control terminal of the charge control transistor 1. When overcharge is detected by the overcharge detection circuit 41, the first switching circuit 23 switches a signal that is output to the control terminal of the charge control transistor 1, from a charge control signal a1 to a first potential-difference detection signal b1. With this arrangement, when overcharge is not detected, the charge control circuit 22 can turn on or off the charge control transistor 1, based on the charge control signal a1.

When a return from the overcharge is detected by the overcharge-return detection circuit 42, the first switching circuit 23 switches a signal that is output to the control terminal of the charge control transistor 1, from the first potential-difference detection signal b1 to the charge control signal a1. With this arrangement, upon returning from the overcharge, the charge control circuit 22 can turn on or off the charge control transistor 1, based on the charge control signal a1.

When an charge overcurrent is detected by the overcurrent detection circuit 45, the first switching circuit 23 outputs the charge control signal a1 to turn the charge control transistor 1 off, to the control terminal of the charge control transistor 1. With this arrangement, the charge control circuit 22 can interrupt the charge overcurrent based on the charge control signal a1.

The battery protection circuit 10A includes a discharge control circuit 32 and a second switching circuit 33. When overdischarge is not detected by the overdischarge detection circuit 43, the discharge control circuit 32 outputs a discharge control signal a2 to control the discharge control transistor 2, to the control terminal coupled to the discharge control transistor 2. When overdischarge is detected by the overdischarge detection circuit 43, the second switching circuit 33 switches a signal to be output to the control terminal coupled to the discharge control transistor 2, from a discharge control signal a2 to a second potential-difference detection signal b2. With this arrangement, when overdischarge is not detected, the discharge control circuit 32 can turn on or off the discharge control transistor 2, based on the discharge control signal a2.

When the return from the overdischarge is detected by the overdischarge-return detection circuit 44, the second switching circuit 33 switches a signal that is output to the control terminal of the discharge control transistor 2, from the second potential-difference detection signal b2 to the discharge control signal a2. With this arrangement, upon returning from the overdischarge, the discharge control circuit 32 can turn on or off the discharge control transistor 2, based on the discharge control signal a2.

When discharge current is detected by the overcurrent detection circuit 45, the second switching circuit 33 outputs the discharge control signal a2 to turn the discharge control transistor 2 off, to the control terminal of the discharge control transistor 2. With this arrangement, the discharge control circuit 32 can interrupt the discharge overcurrent, based on the discharge control signal a2.

The battery protection circuit 10A includes a charger-connection detection circuit 50 that detects a connection with the charger 91. The battery protection circuit 10A also includes a control circuit 46 that is connected to the charger-connection detection circuit 50. The charger-connection detection circuit 50 includes, for example, a resistor 51, a switch 52 and a monitor circuit 53. When overdischarge is detected by the overdischarge detection circuit 43, the control circuit 46 turns the switch 52 on, based on the output of the discharge control circuit 32 to thereby cause the terminal VM to be maintained at the potential at the terminal VDD via the resistor 51. With this arrangement, if the terminal PP and the terminal PM are open, the potential at the terminal VM is fixed at the potential at the terminal VDD, and if the charger 91 is connected between the terminal PP and the terminal PM, the potential at the terminal VM is reduced by the output voltage of the charger 91, in comparison to the potential at the terminal VDD. The charger-connection detection circuit 50 detects the presence or absence of the connection with the charger 91, by the monitor circuit 53 that monitors changes in the potential at the terminal VM.

When the connection with the charger 91 is detected by the charger-connection detection circuit 50 and the return from the overdischarge is detected by the overdischarge-return detection circuit 44, the control circuit 46 releases the connection of the terminal VM to the terminal VDD by turning the switch 52 off.

The monitor circuit 53 includes an input, and an input potential can be changed to the potential at the terminal VDD through the switch 52. The monitor circuit 53 is, for example, a complementary metal oxide semiconductor (CMOS) inverter circuit.

When the charger 91 is connected between the terminal PP and the terminal PM, the potential at the terminal VM is reduced to be less than or equal to the potential at the terminal VSS. With this arrangement, the input of the CMOS inverter in the monitor circuit 53 changes from a high level to a low level, while an output of the CMOS inverter in the monitor circuit 53 changes from a low level to a high level. The control circuit 46 detects the connection with the charger 91 by detecting that the output of the CMOS inverter in the monitor circuit 53 changes from the low level to the high level.

Hereafter, the operation of the differential amplifiers 21 and 31 will be described in more detail.

FIG. 13 is a diagram illustrating an example of a starting condition of each differential amplifier. Under a condition (in the normal state) in which abnormal charging or abnormal discharging are not detected, both the differential amplifiers 21 and 31 are not used (in an off-state). Under a condition (in the overcharged state) in which overcharge is detected, the differential amplifier 21 is used (in an on-state) without using the differential amplifier (off-state). In the overcharged state, the potential difference Δ1 between the terminal BM and the terminal PM is controlled based on feedback from the differential amplifier 21. In an overdischarged state 1 (condition in which (i) overdischarge is detected and (ii) either a condition in which the connection with the charger is detected or a condition in which the output of another battery pack is provided), the differential amplifier 31 is used (in an on-state) without using the differential amplifier 21 (off-state). In the overdischarged state 1, the potential difference Δ2 between the terminal BM and the terminal PM is controlled based on feedback from the differential amplifier 31. In an overdischarged state 2 (condition, i.e., a standby state, in which overdischarge is detected for all of parallel connected battery packs), both the differential amplifiers 21 and 31 are not used (in an off-state).

FIG. 14 is a diagram for describing the operation of the differential amplifier that controls the charge control transistor in the overcharged state. The differential amplifier 21 includes (i) a non-inverting input connected to the terminal VM (terminal PM), (ii) an inverting input set at a potential that is increased by a fixed voltage Va (e.g., +50 mV) in comparison to the terminal VSS (terminal BM), and (iii) an output connected to the terminal CO that is connected to the control terminal of the charge control transistor 1.

By such a configuration, when the terminal PM attempts to become at a potential that is greater than a given potential that is obtained by adding (i) the potential at the terminal BM and (ii) the fixed voltage Va, the differential amplifier 21 increases the output voltage that is applied to the control terminal of the charge control transistor 1. With this arrangement, input and output impedance of the charge control transistor 1, which operates in the saturated region, is reduced and thus negative feedback can be provided in order to reduce the potential at the terminal PM. Therefore, the differential amplifier 21 can adjust the potential difference between the terminal PM and the terminal BM to the fixed voltage Va, while causing the current in the discharging direction (direction from the terminal PM to the terminal BM) of the secondary battery 70, to flow into the charge control transistor 1.

In contrast, when the terminal PM becomes at a potential that is less than or equal to the potential that is obtained by adding (i) the potential at the terminal BM and (ii) the fixed voltage Va, the differential amplifier 21 reduces the output voltage that is applied to the control terminal of the charge control transistor 1 and thus input and output impedance of the charge control transistor 1 is increased. As a result, the charge control transistor 1 switches to the off-state. With this arrangement, the differential amplifier 21 can interrupt the current in the charging direction (direction from the terminal BM to the terminal PM) of the secondary battery 70, by turning the charge control transistor 1 off.

FIG. 15 is a diagram for describing the operation of the differential amplifier that controls the discharge control transistor in the overdischarged state. The differential amplifier 31 includes (i) a non-inverting input connected to the terminal VSS (terminal BM), (ii) an inverting input set at a potential that is increased by a fixed voltage Vb (for example, +50 mV) in comparison to the potential at the terminal VM (terminal PM), and (iii) an output connected to the terminal DO that is connected to the control terminal of the discharge control transistor 2.

By such a configuration, when the terminal PM attempts to become at a potential that is less than or equal to a given potential, which is obtained by subtracting the fixed voltage Vb from the potential at the terminal BM, the differential amplifier 31 increases the output voltage that is applied to the control terminal of the charge control transistor 2. With this arrangement, input and output impedance of the charge control transistor 2, which operates in the saturated region, is reduced and thus negative feedback can be provided in order to increase the potential at the terminal PM. Therefore, the differential amplifier 31 can adjust the potential difference between the terminal BM and the terminal PM to the fixed voltage Vb, while causing the current in the charging direction (direction from the terminal BM to the terminal PM) of the secondary battery 70, to flow into the charge control transistor 2.

In contrast, when the terminal PM becomes at a potential that is greater than the potential that is obtained by subtracting the fixed voltage Vb from the potential at the terminal BM, the differential amplifier 31 reduces the output voltage that is applied to the control terminal of the charge control transistor 2 and thus input and output impedance of the charge control transistor 2 is increased. As a result, the charge control transistor 2 switches to the off-state. With this arrangement, the differential amplifier 31 can interrupt the current in the discharging direction (direction from the terminal PM to the terminal BM) of the secondary battery 70, by turning the charge control transistor 2 off.

FIG. 16 is a diagram illustrating state transition of the secondary battery protection circuit according to the first embodiment. FIG. 16 will be described with reference to FIG. 12.

In the normal state, overcharge and overdischarge are not detected. In the normal state, the charge control circuit 22 selects the charge control signal a1 as a signal that is output to the terminal CO, by using the first switching circuit 23, and then outputs, to the terminal CO, the charge control signal a1 in a high level to turn the charge control transistor 1 on. Also, in the normal state, the discharge control circuit 32 selects the discharge control signal a2 as a signal that is output to the terminal DO, by using the second switching circuit 33, and then outputs, to the terminal DO, the discharge control signal a2 in a high level to turn the discharge control transistor 2 on.

In the normal state, when overcharge is detected by the overcharge detection circuit 41 (when an overcharge detection signal is output), the operational state of the battery protection circuit 10A transitions from the normal state into the overcharged state. The overcharged state is a state (state in which the overcharge detection signal is output) in which overcharge is detected by the overcharge detection circuit 41. In the overcharged state, the charge control circuit 22 selects the first potential-difference detection signal b1 as a signal that is output to the terminal CO, by using the first switching circuit 23, and then outputs, to the terminal CO, the first potential-difference detection signal b1 to operate the charge control transistor 1 in the saturated region. In contrast, in the overcharged state, the discharge control circuit 32 operates as in the normal state.

In the overcharged state, when the return from the overcharge is detected by the overcharge-return detection circuit 42 (when an overcharge-return detection signal is output), the operational state of the battery protection circuit 10A changes from the overcharged state to the normal state.

In the normal conditions, when overdischarge is detected by the overdischarge detection circuit 43 (when an overdischarge detection signal is output), the operational state of the battery protection circuit 10A changes from the normal state to the overdischarged state. The overdischarged state is a state (state in which the overdischarge detection signal is output) in which overdischarge is detected by the overdischarge detection circuit 43. In the overdischarged state, the discharge control circuit 32 selects the second potential-difference detection signal b2 as a signal that is output to the terminal DO, by using the second switching circuit 33, and then outputs, to the terminal DO, the second potential-difference detection signal b2 to operate the discharge control transistor 2 in the saturated region. In contrast, in the overdischarged state, the charge control circuit 22 operates as in the normal state. In the overdischarged state, the control circuit 46 causes the terminal VM to be set at the potential at the terminal VDD by turning on the switch 52 of the charger-connection detection circuit 50.

When the operational state of the battery protection circuit 10A changes to the overdischarged state, the charger 91 is yet to be connected to a given battery pack at an timing that is changed to the overcharged state, and thus the battery protection circuit 10A transitions into the standby state in which the overdischarge-return detection circuit 44 is shut down. For example, in the overdischarged state, when the connection with the charger 91 is not detected by the charger-connection detection circuit 50 for a predetermined time period or longer, the operational state of the battery protection circuit 10A changes from the overdischarged state to the standby state.

In the standby state, the discharge control circuit 32 selects the discharge control signal a2 as a signal that is output to the terminal DO, by using the second switching circuit 33, and then outputs, to the terminal DO, the discharge control signal a2 in a low level to turn the discharge control transistor 2 off. In contrast, in the standby state, the charge control circuit 22 operates as in the overdischarged state.

In the standby state, when the connection with the charger 91 is detected by the charger-connection detection circuit 50, the standby state is released, and thus the overdischarge-return detection circuit 44 starts up. Therefore, the operational state of the battery protection circuit 10A changes from the standby state to the overdischarged state. When the standby state is changed to the overdischarged state, the second potential-difference control circuit 30 and the overdischarge-return detection circuit 44 operate. With this arrangement, in the overdischarged state, feedback operations can be performed based on the second potential-difference detection signal b2, such that the discharge control transistor 2 operates in the saturated region. Also, the return from the overdischarge can be detected. When the return from the overdischarge is detected by the overdischarge-return detection circuit 44 (when an overdischarge-return detection signal is output), the operational state of the battery protection circuit 10A changes from the overdischarged state to the normal state.

Second Embodiment

Figure 17:
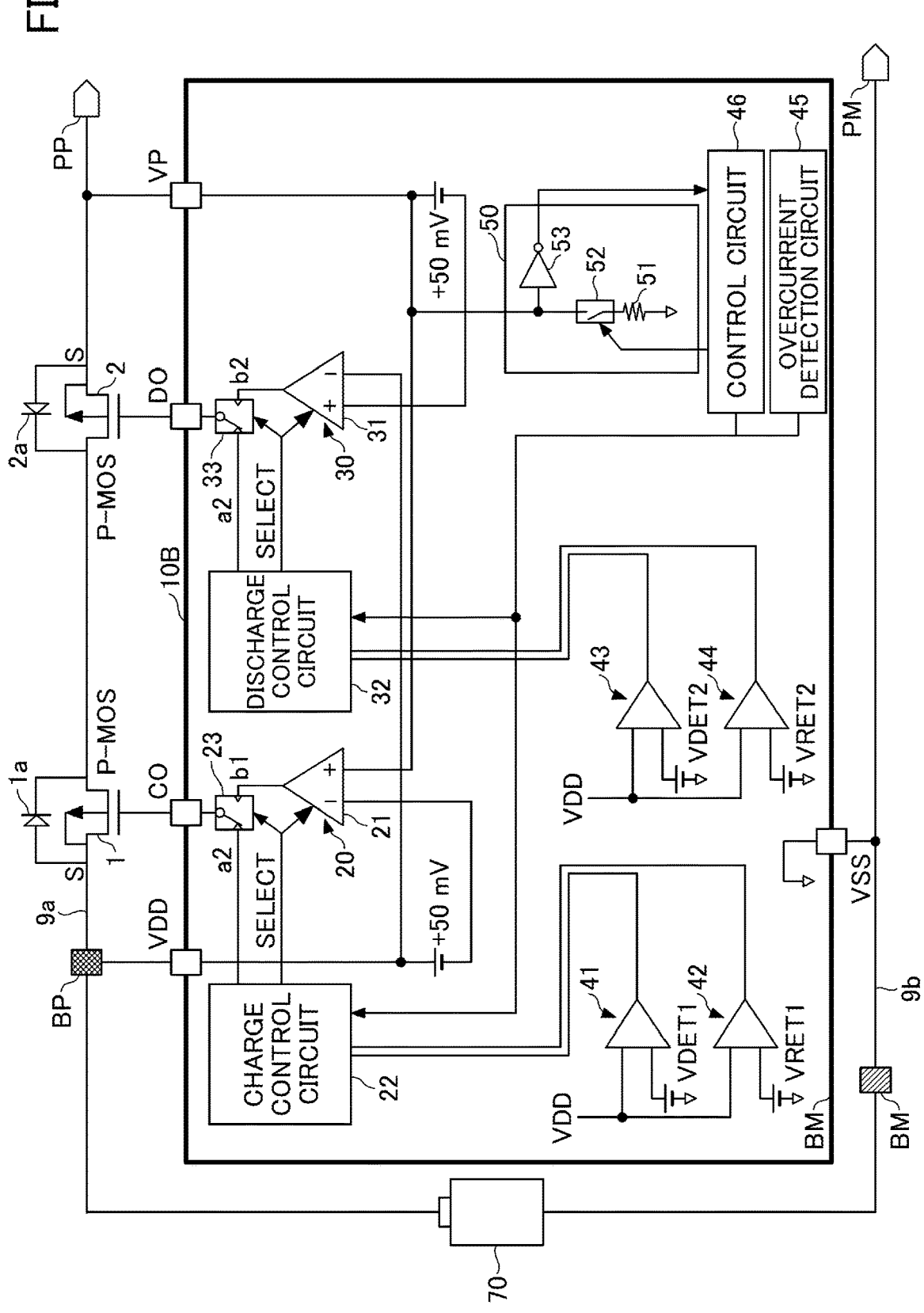
FIG. 17 is a diagram illustrating an example of the configuration of a battery protection circuit according to a second embodiment.

FIG. 17 is a diagram illustrating an example of the configuration of a battery protection circuit 10B according to a second embodiment. The battery protection circuit 10B according to the second embodiment differs from the battery protection circuit 10A according to the first embodiment in that the secondary battery 70 is protected by the charge control transistor 1 and the discharge control transistor 2 that are inserted in the current path 9*a*. In the second embodiment, description for the same configuration and effect as described in the first embodiment is omitted by reference to the above description.

In the second embodiment, transistors 1 and 2 are, for example, P-channel MOSFETs. The battery protection circuit 10B includes, for example, the charge control terminal (terminal CO), the discharge control terminal (terminal DO), a monitor terminal (terminal VP), the power supply terminal (terminal VDD), and the ground terminal (terminal VSS).

The terminal VP is used to monitor the potential at the terminal PP, and is connected to the terminal PP. The terminal VP is used by, for example, the charger-connection detection circuit 50 in the battery protection circuit 10B to monitor the presence or absence of the connection with the load 90 or the charger 91, and is connected to a node in the positive-side current path 9*a* that is between the transistor 2 and the terminal PP.

The overcurrent detection circuit 45 monitors the monitored voltage VI, which is a voltage between the terminal VP and the terminal VDD, to detect overcurrent flowing into a path between the terminal PP and the terminal BP.

A state in which discharging of the secondary battery 70 is interrupted by turning the discharge control transistor 2 off and in which the terminal VP is connected to the terminal VSS by turning the switch 252 on refers to a pull-down state pd. In the pull-down state pd, by turning the switch 52 on, the potential at the terminal VP is reduced to a potential that is the same as that at the terminal VSS. In the pull-down state pd, when the charger 91 is connected between the terminal PP and the terminal PM, the potential at the terminal VP is increased to be greater than or equal to the potential at the terminal VDD. With this arrangement, in the pull-down state pd, when the monitor circuit 53 detects that the potential at the terminal VP is greater than a predetermined reference potential Vvp, the charger-connection detection circuit 50 can determine that the charger 91 is connected to a given secondary battery.

Figure 18:
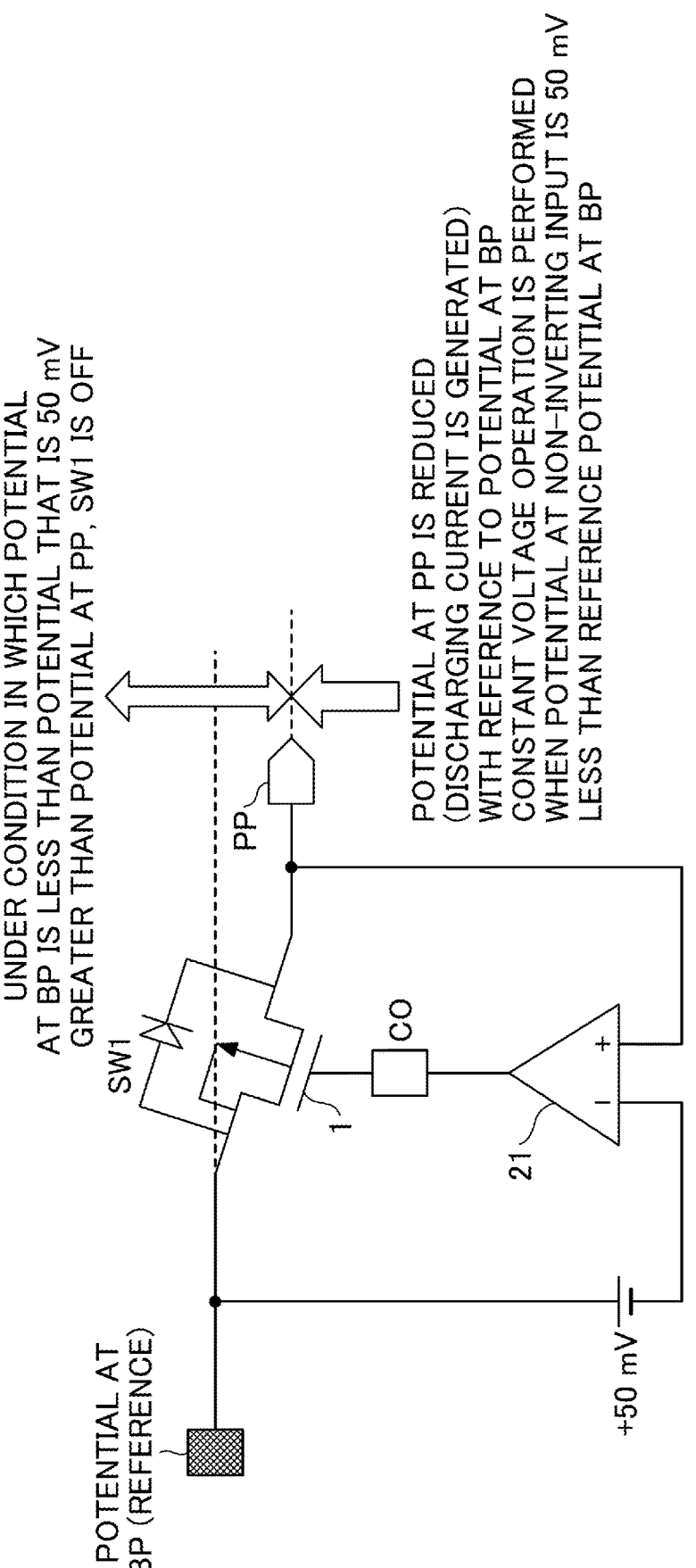
FIG. 18 is a diagram for description the operation of the differential amplifier that controls the charge control transistor in the overcharged state.

FIG. 18 is a diagram for description the operation of the differential amplifier that controls the charge control transistor in the overcharged state. The differential amplifier 21 includes (i) the non-inverting input connected to the terminal VP (terminal PP), (ii) the inverting input set at a potential that is reduced by the fixed voltage Va (e.g., +50 mV) in comparison to the potential at the terminal VDD (terminal BP), and (iii) the output connected to the terminal CO that is connected to the control terminal of the charge control transistor 1.

By such a configuration, when the terminal PP attempts to be at a potential that is less than a given potential that is obtained by subtracting the potential at the terminal BP from the fixed voltage Va, the differential amplifier 21 reduces the output voltage that is applied to the control terminal of the charge control transistor 1. With this arrangement, input and output impedance of the charge control transistor 1, which operates in the saturated region, is reduced and thus negative feedback can be provided in order to increase the potential at the terminal PP. Therefore, the differential amplifier 21 can adjust the potential difference between the terminal BP and the terminal PP to the fixed voltage Va, while causing the current in the discharging direction (direction from the terminal BP to the terminal PP) of the secondary battery 70 to flow into the charge control transistor 1.

By such a configuration, when the terminal PP attempts to become at a potential that is less than a given potential that is obtained by subtracting the fixed voltage Va from the potential at the terminal BP, the differential amplifier 21 reduces the output voltage that is applied to the control terminal of the charge control transistor 1. With this arrangement, input and output impedance of the charge control transistor 1, which operates in the saturated region, is reduced and thus negative feedback can be provided in order to increase the potential at the terminal PP. Therefore, the differential amplifier 21 can adjust the potential difference between the terminal BP and the terminal PP to the fixed voltage Va, while causing the current in the discharging direction (direction from the terminal BP to the terminal PP) of the secondary battery 70, to flow into the charge control transistor 1.

In contrast, when the terminal PP becomes at a potential that is greater than or equal to the potential that is obtained by subtracting the fixed voltage Va from the potential at the terminal BP, the differential amplifier 21 increases the output voltage that is applied to the control terminal of the charge control transistor 1 and thus input and output impedance of the charge control transistor 1 is increased. As a result, the charge control transistor 1 switches to the off-state. With this arrangement, the differential amplifier 21 can interrupt the current in the charging direction (direction from the terminal PP to the terminal BP) of the secondary battery 70, by turning the charge control transistor 1 off.

Figure 19:
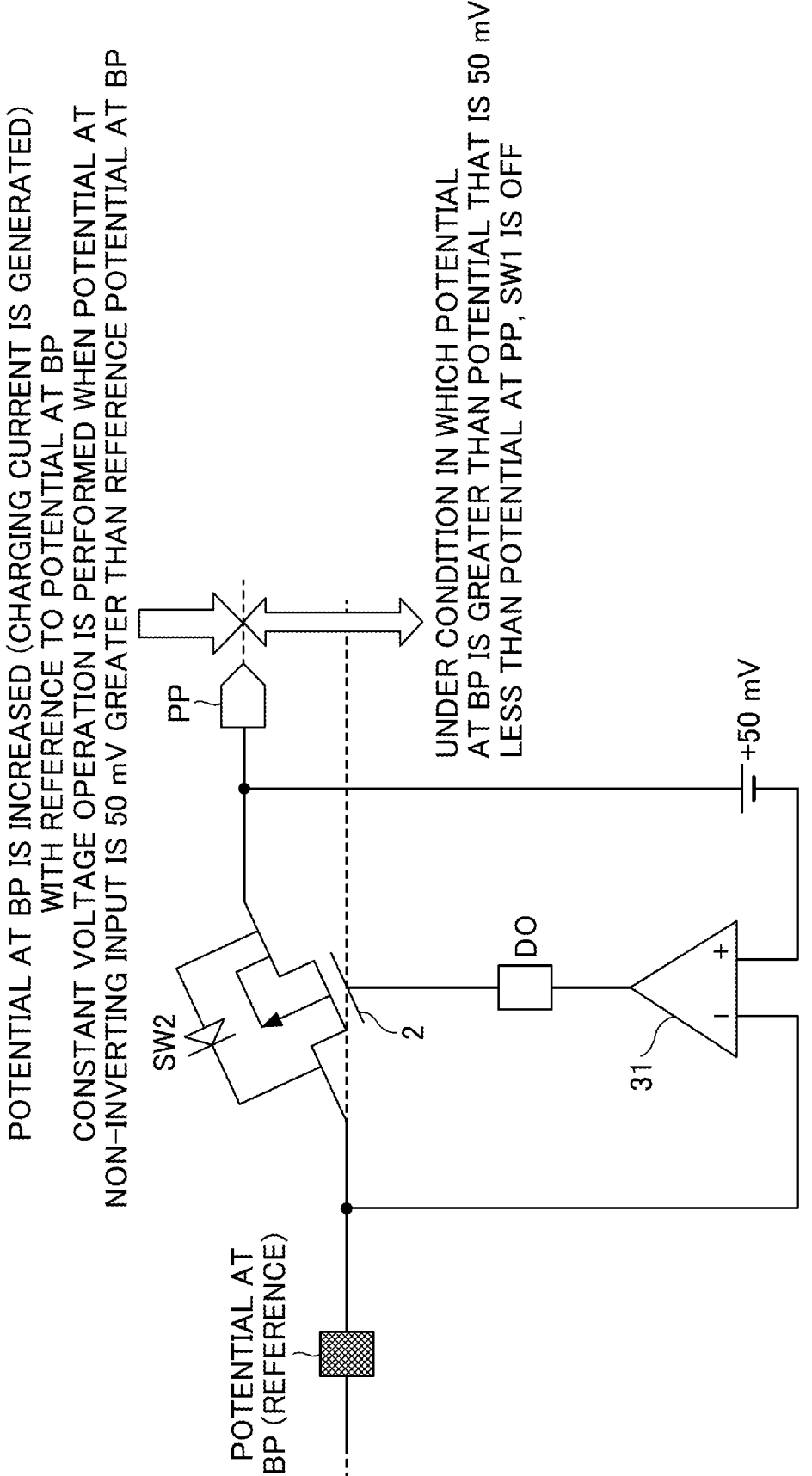
FIG. 19 is a diagram for description the operation of the differential amplifier that controls the discharge control transistor in the overdischarged state.

FIG. 19 is a diagram for description the operation of the differential amplifier that controls the discharge control transistor in the overdischarged state. The differential amplifier 31 includes (i) the non-inverting input connected to the terminal VDD (terminal BP), (ii) the inverting input set at a potential that is reduced by the fixed voltage Vb (e.g., +50 mV) in comparison to the terminal VP (terminal PP), and (iii) the output connected to the terminal DO that is connected to the control terminal of the discharge control transistor 2.

By such a configuration, when the terminal PP attempts to become at a potential that is greater than a given potential that is obtained by adding (i) the potential at the terminal BP and (ii) the fixed voltage Vb, the differential amplifier 31 reduces the output voltage that is applied to the control terminal of the charge control transistor 2. With this arrangement, input and output impedance of the charge control transistor 2, which operates in the saturated region, is reduced and thus negative feedback can be provided in order to reduce the potential at the terminal PP. Therefore, the differential amplifier 31 can adjust the potential difference between the terminal PP and the terminal BP to the fixed voltage Vb, while causing the current in the charging direction (direction from the terminal PP to the terminal BP) of the secondary battery 70, to flow into the charge control transistor 2.

In contrast, when the terminal PP becomes at a potential that is less than or equal to the potential that is obtained by adding (i) the potential at the terminal BP and (ii) the fixed voltage Vb, the differential amplifier 31 reduces the output voltage that is applied to the control terminal of the charge control transistor 2 and thus input and output impedance of the charge control transistor 2 is increased. As a result, the charge control transistor 2 switches to the off-state. With this arrangement, the differential amplifier 31 can interrupt the current in the discharging direction (direction from the terminal BP to the terminal PP) of the secondary battery 70, by turning the charge control transistor 2 off.

Although the embodiments have been described using the secondary battery protection circuit, the battery pack, the battery system, and a method for protecting the secondary battery, the present disclosure is not limited to the above embodiments. Various modifications and changes, including combinations or substitutions of some or all of different embodiments, can be made.

For example, the charge control transistor 1 and the discharge control transistor 2 may be replaced with each other with respect to the locations in the drawings. The switching circuit 3 may be incorporated into the battery protection circuit 10.

What is claimed is:

1. A secondary battery protection circuit configured to be connected to a charge control transistor inserted in a charge path between an electrode of a secondary battery and a terminal for a load and a charger, the charge control transistor being configured to interrupt the charge path such that the secondary battery is protected from over-charge, and a discharge control transistor inserted in a discharge path between the electrode of the secondary battery and the terminal, the discharge control transistor being config-ured to interrupt the discharge path such that the secondary battery is protected from overdischarge, the secondary battery protection circuit comprising:

an overcharge detection circuit configured to detect the overcharge of the secondary battery; and a potential-difference control circuit configured to control the charge control transistor to maintain a constant potential difference between a first input and a second input of the potential-different control circuit, wherein the first input is coupled to a secondary battery elec-trode side of the charge control transistor, and the second input is coupled to a terminal side for the load and the charger of the charge control transistor.

2. The secondary battery protection circuit according to claim 1, wherein the potential-difference control circuit is configured to provide a control terminal of the charge control transistor with feedback on a potential-difference detection sig-nal, upon detecting the overcharge by the overcharge detection circuit, and control the constant potential difference such that a cur-rent flows into the charge control transistor in a dis-charging direction of the secondary battery.

3. The secondary battery protection circuit according to claim 2, further comprising:

a charge control circuit configured to output a charge control signal to control the charge control transistor, to the control terminal of the charge control transistor when the overcharge is not detected by the overcharge detection circuit; and a first switching circuit configured to switch a signal that is output to the control terminal of the charge control transistor, from the charge control signal to the poten-tial-difference detection signal, upon detecting the overcharge by the overcharge detection circuit.

4. The secondary battery protection circuit according to claim 3, further comprising: an overcharge-return detection circuit configured to detect a return from the overcharge, wherein the first switching circuit is configured to switch the signal that is output to the control terminal of the charge control transistor, from the potential-difference detection signal to the charge control signal, upon detecting the return from the overcharge by the over-charge-return detection circuit.

5. The secondary battery protection circuit according to claim 3, further comprising: a charge-overcurrent detection circuit configured to detect a charge overcurrent through the secondary battery, wherein the first switching circuit is configured to output the charge control signal to turn the charge control transistor off, to the control terminal of the charge control transistor, upon detecting the charge overcur-rent by the charge-overcurrent detection circuit.

6. The secondary battery protection circuit according to claim 1, wherein the potential-difference control circuit is configured to provide a control terminal of the discharge control tran-sistor with feedback on a potential-difference detection signal, upon detecting the overdischarge by the over-discharge detection circuit, and control the constant potential difference such that a cur-rent flows into the discharge control transistor in a charging direction of the secondary battery.

7. The secondary battery protection circuit according to claim 6, further comprising:

a discharge control circuit configured to output a dis-charge control signal to control the discharge control transistor, to the control terminal of the discharge control transistor when the overdischarge is not detected by the overdischarge detection circuit; and a second switching circuit configured to switch a signal that is output to the control terminal of the discharge control transistor, from the discharge control signal to the potential-difference detection signal, upon detect-ing the overdischarge by the overdischarge detection circuit.

8. The secondary battery protection circuit according to claim 7, further comprising: an overdischarge-return detec-tion circuit configured to detect a return from the overdis-charge, wherein the second switching circuit is configured to switch the signal that is output to the control terminal of the discharge control transistor, from the potential-difference detection signal to the discharge control signal, upon detecting the return from the overdis-charge by the overdischarge-return detection circuit.

9. The secondary battery protection circuit according to claim 8, further comprising: a charger-connection detection circuit configured to detect a connection with the charger, wherein each of the potential-difference control circuit and the overdischarge-return detection circuit is con-figured to operate upon detecting the connection with the charger by the charger-connection detection circuit.

10. The secondary battery protection circuit according to claim 9, wherein the charger-connection detection circuit includes a CMOS inverter circuit.

11. The secondary battery protection circuit according to claim 7, further comprising: a discharge-overcurrent detec-tion circuit configured to detect a discharge overcurrent from the secondary battery, wherein the second switching circuit is configured to output the discharge control signal to turn the discharge control transistor off, to the control terminal of the discharge control transistor, upon detecting the dis-charge overcurrent by the discharge-overcurrent detec-tion circuit.

12. A battery pack comprising:

the secondary battery protection circuit of claim 1;

the secondary battery;

the charge control transistor; and the discharge control transistor.

13. A battery system comprising:

a plurality of battery packs electrically coupled in parallel,
each battery pack being the battery pack of claim 12.

14. A method for protecting a secondary battery, the method comprising:

interrupting, by a charge control transistor, a charge path such that the secondary battery is protected from overcharge, the charge control transistor being inserted in the charge path between an electrode of the secondary battery and a terminal for a load and a charger;

interrupting, by a discharge control transistor, a discharge path such that the secondary battery is protected from overdischarge, the discharge control transistor being inserted in the discharge path between the electrode of the secondary battery and the terminal;

detecting the overcharge of the secondary battery; and controlling the charge control transistor to maintain a constant potential difference between a first input and a second input of the potential-different control circuit, wherein the first input is coupled to a secondary battery electrode side of the charge control transistor, and the second input is coupled to a terminal side for the load and the charger of the charge control transistor.

* * * * *